United States Patent
Nelson et al.

(10) Patent No.: US 7,044,376 B2
(45) Date of Patent: May 16, 2006

(54) AUTHENTICATION METHOD AND APPARATUS FOR USE WITH COMPRESSED FLUID PRINTED SWATCHES

(75) Inventors: David J. Nelson, Rochester, NY (US); Seshadri Jagannathan, Pittsford, NY (US); Ramesh Jagannathan, Rochester, NY (US); Thomas N. Blanton, Rochester, NY (US); Sridhar Sadasivan, Rochester, NY (US); Byron R. Sever, Rochester, NY (US); David D. Tuschel, Monroeville, PA (US)

(73) Assignee: Eastman Kodak Company, Rochester, NY (US)

( * ) Notice: Subject to any disclaimer, the term of this patent is extended or adjusted under 35 U.S.C. 154(b) by 455 days.

(21) Appl. No.: 10/625,426

(22) Filed: Jul. 23, 2003

(65) Prior Publication Data

US 2005/0018013 A1    Jan. 27, 2005

(51) Int. Cl.
*G06K 7/14* (2006.01)
(52) U.S. Cl. .................................... 235/454
(58) Field of Classification Search ............... 235/454
See application file for complete search history.

(56) References Cited

U.S. PATENT DOCUMENTS

| | | | |
|---|---|---|---|
| 4,734,227 A | 3/1988 | Smith | |
| 5,149,949 A * | 9/1992 | Wike, Jr. | 235/462.38 |
| 5,789,505 A | 8/1998 | Wilkinson et al. | |
| 5,944,996 A | 8/1999 | DeSimone et al. | |
| 5,986,550 A * | 11/1999 | Rapaport et al. | 340/572.3 |
| 6,131,421 A | 10/2000 | Jureller et al. | |
| 6,214,250 B1 * | 4/2001 | Moh et al. | 216/94 |
| 6,228,826 B1 | 5/2001 | DeYoung et al. | |
| 6,471,327 B1 | 10/2002 | Jagannathan et al. | |
| 2002/0021003 A1 | 2/2002 | McGrew | |
| 2002/0118245 A1 | 8/2002 | Jagannathan et al. | |
| 2002/0118246 A1 | 8/2002 | Jagannathan et al. | |
| 2002/0160412 A1 | 10/2002 | Bawendi et al. | |

(Continued)

FOREIGN PATENT DOCUMENTS

EP    1 236 519 A1    9/2002

(Continued)

OTHER PUBLICATIONS

Supercritical Fluid Cleaning, Fundamentals, Technology and Applications, John McHardy & Samuel Sawan, EDS., Noyes Publications, Westwood, New Jersey (1998), pp. 87-120, Chapter 5, "Surfactants and Microemulsions in Supercritical Fluids" by Kevin Jackson, & John L. Fulton.

(Continued)

*Primary Examiner*—Daniel StCyr
(74) *Attorney, Agent, or Firm*—Robert Luke Walker

(57) ABSTRACT

Authentication systems, apparatus, and methods authenticate an identification marking including a nanocrystalline material. One or more properties of the marking are ascertained to provide a measured profile. The measured profile is compared to at least one member of a closed set of reference profiles. Each reference profile has predetermined values of one or more properties. Each reference profile is unique within the set. At least one reference profile is characteristic of an indicator material in a nanocrystalline morphology and non-characteristic of the same indicator material in a bulk morphology.

49 Claims, 9 Drawing Sheets

U.S. PATENT DOCUMENTS

| | | |
|---|---|---|
| 2003/0030706 A1 | 2/2003 | Jagannathan et al. |
| 2003/0098357 A1 | 5/2003 | Cummings et al. |
| 2003/0107614 A1 | 6/2003 | Nelson et al. |
| 2003/0117471 A1 | 6/2003 | Sharma |
| 2003/0121447 A1 | 7/2003 | Irvin et al. |
| 2003/0122106 A1 | 7/2003 | Irvin et al. |

FOREIGN PATENT DOCUMENTS

| | | |
|---|---|---|
| EP | 1 275 511 A2 | 1/2003 |
| EP | 1 318 021 A1 | 6/2003 |
| EP | 1 321 303 A1 | 6/2003 |
| WO | 00/18591 | 4/2000 |
| WO | WO 02/45868 A2 | 6/2002 |
| WO | WO 03/006563 A1 | 1/2003 |
| WO | WO 03/053561 A2 | 7/2003 |

OTHER PUBLICATIONS

J. Bernstein & J. Henk, Industrial Applications of X-Ray Diffraction, Chapter 25, Frank H. Chung, & Deane K. Smith, eds., Marcel Dekker Inc., New York pp. 531-532, (2000).

Martin Brickmann et al., Journal of the American Chemical Society, 2000, 122, 5147-5157.

M. Braun, et al., Journal of Chemical Physics, vol. 114, No. 21, pp. 9625-9632 (Jun. 1, 2001).

A. H. Herz, Photographic Science & Engineering, vol. 18, No. 3, May/Jun. 1974, pp. 323-335, Dye-Dye Interactions of Cyanines in Solution and at AgBr Surfaces.

E. Jelley, Nature, Letters to the Editor, 138, Dec. 12, 1936, pp. 1009-1010.

* cited by examiner

AUTHENTICATION METHOD AND APPARATUS FOR USE WITH COMPRESSED FLUID PRINTED SWATCHES

CROSS REFERENCE TO RELATED APPLICATIONS

Reference is made to commonly assigned, co-pending U.S. patent application Ser. No. 10/016,054, entitled: METHOD AND APPARATUS FOR PRINTING, filed Dec. 6, 2001, in the name of David J. Nelson, Sridhar Sadasivan, Ramesh Jagannathan, Seshadri Jagannathan, Glen C. Irvin, Jr., Suresh Sunderrajan, John E. Rueping, Gary E. Merz, which is hereby incorporated herein by reference.

Reference is made to commonly assigned, co-pending U.S. patent application Ser. No. 10/460,245, entitled: A METHOD OF FORMING A COLOR FILTER, filed Jun. 12, 2003, in the name of Sridhar Sadasivan, Ramesh Jagannathan, Seshadri Jagannathan, Rajesh Vinodrai Mehta, David J. Nelson, Glen C. Irvin, Jr., which is hereby incorporated herein by reference.

Reference is made to commonly assigned, co-pending U.S. patent application Ser. No. 10/162,956, entitled: METHOD AND APPARATUS FOR PRINTING, filed Jun. 5, 2002, in the name of Sridhar Sadasivan, Seshadri Jagannathan, Suresh Sunderrajan, Gary E. Merz, John E. Rueping, Glen C. Irvin, Jr., Ramesh Jagannathan, Rajesh Vinodrai Mehta, David J. Nelson, which is hereby incorporated herein by reference.

Reference is made to commonly assigned, co-pending U.S. patent application Ser. No. 10/051,888, entitled: METHOD AND APPARATUS FOR PRINTING AND COATING, filed Jan. 17, 2002, in the name of Sridhar Sadasivan, David J. Nelson, Seshadri Jagannathan, Ramesh Jagannathan, Suresh Sunderrajan, Glen C. Irvin, Jr., Gary E. Merz, John E. Rueping, which is hereby incorporated herein by reference.

Reference is made to commonly assigned, co-pending U.S. patent application Ser. No. 10/163,326, entitled: METHOD AND APPARATUS FOR PRINTING, CLEANING AND CALIBRATING, filed Jun. 5, 2002, in the name of Sridhar Sadasivan, David J. Nelson, Seshadri Jagannathan, Gary E. Merz, John E. Rueping, Glen C. Irvin, Jr., Ramesh Jagannathan, Rajesh Vinodrai Mehta, which is hereby incorporated herein by reference.

Reference is made to commonly assigned, co-pending U.S. patent application Ser. No. 10/602,840, entitled: AN APPARATUS AND METHOD OF PRODUCING MULTIPLE SPECTRAL DEPOSITS FROM A MIXTURE OF A COMPRESSED FLUID AND A MAKING MATERIAL, filed Jun. 24, 2003, in the name of David J. Nelson, Sridhar Sadasivan, Ramesh Jagannathan, Seshadri Jagannathan, Glen C. Irvin, Jr., Rajesh Vinodrai Mehta, which is hereby incorporated herein by reference.

Reference is made to commonly assigned, co-pending U.S. patent application Ser. No. 10/602,430, entitled: AN ARTICLE HAVING MULTIPLE SPECTRAL DEPOSITS, filed Jun. 24, 2003, in the name of David J. Nelson, Sridhar Sadasivan, Ramesh Jagannathan, Seshadri Jagannathan, Glen C. Irvin, Jr., Rajesh Vinodrai Mehta, which is hereby incorporated herein by reference.

FIELD OF THE INVENTION

The invention relates to supercritical and compressed fluid printing and to methods and apparatus for authenticating markings and more particularly relates to authentication method and apparatus for use with compressed fluid printed swatches.

BACKGROUND OF THE INVENTION

Markings and seals have long been used to authenticate the nature or provenance of documents and other items. Continuing efforts have been directed to preventing intentional or accidental misuse. For this purpose, two approaches have generally been followed, separately or in combination. One approach is to increase the difficulty of accessing information communicated by the marking. The other approach is to increase the difficulty of physically reproducing the marking.

The first approach generally involves encryption, which has strong and weak points. Typically, the more difficult it is to break a code, the more difficult and complex is the equipment required to utilize the code.

It is well known to provide an encodement in a form that is not readable without the use of specific equipment. The machine readable code or "symbology" may be visible to the eye or invisible, but requires specialized equipment to read and decode. The terms "symbology" or "symbologies" are generally employed to denote spatial patterns of elements, in which each mark has a defined shape and is separated from an adjacent element by a spacing. Information is encoded in the shapes and/or the spacings. The term "symbology" is inclusive of two- and three-dimensional bar codes and other codes. Typically, the decoded information output by the reader is used to provide other information by means of a look-up table or the like. The term "look-up table" refers to both a complement of logical memory in one or more computing devices and to necessary equipment and software for controlling and providing access to the logical memory.

The second approach, physical limitations on the reproduction of a marking, is limited by the output provided by a particular technology. At one time, engraving provided an output that was difficult and expensive to reproduce or imitate. With improvements in other printing technologies, engraving is no longer sufficient, by itself, for a great many authentication purposes.

Technologies are known that use compressed fluid solvents to create thin films and particle streams. The term "compressed fluid" and like terms are used herein to refer to both supercritical fluids and other fluids that are compressed, but are not supercritical. For example, U.S. Pat. No. 4,734,227, issued Mar. 29, 1988, discloses a method for depositing solid films or creating fine powders through the dissolution of solid material into a compressed fluid solution and rapidly expanding the solution to create the particles or films.

The use of supercritical $CO_2$ has been suggested as an alternative to organic cleaning solvents, particularly in combination with reverse micelles or microemulsions, as described in *Supercritical Fluid Cleaning*, J. McHardy and S. Sawan, Eds., Noyes Publications, Westwood, N.J. (1998), pp. 87–120, Chapter 5, entitled "Surfactants and Microemulsions in Supercritical Fluids" by K. Jackson and J. Fulton. U.S. Pat. Nos. 5,789,505; 5,944,996; 6,131,421; and 6,228,826 describe cleaning processes employing carbon dioxide as solvent along with surfactants having $CO_2$-philic portions and hydrophilic or otherwise $CO_2$-phobic portions, wherein the combination of $CO_2$ and surfactant are useful for removing $CO_2$-phobic (including hydrophilic) contaminants from a substrate. U.S. Pat. No. 6,131,421 describes the formation of a reverse micelle system useful for removing hydrophilic contaminants when water is also included with the carbon dioxide and surfactant.

PCT Patent Publication WO 02/45868 A2, discloses a method of creating a pattern on a surface of a wafer using compressed carbon dioxide. The method includes dissolving or suspending a material in a solvent phase containing compressed carbon dioxide, and depositing the solution or suspension onto the surface of the wafer, the evaporation of the solvent phase leaving a patterned deposit of the material. The wafer is prepatterned using lithography to provide the wafer with hydrophilic and hydrophobic areas.

U.S. Pat. No. 6,471,327 discloses methods suitable for printing with particles of organic materials having sizes of less than 30 nanometers. The terms "nanocrystals" and "nanocrystalline" and like terms are used herein to refer to particles having a size in the range of 10 to 30 nanometers. Nanocrystalline particulates have a particle size distribution that has a mean/median particle size of less than 30 nanometers. The terms "bulk crystal" and "bulk particulates" and like terms, refer to particles and particulates that have one or more dimensions greater than 30 nanometers.

Polymorphism is a phenomenon of large (bulk state) organic/molecular crystals. Polymorphism is defined as multiple crystal structures of the same molecular entity (J. Bernstein and J. Henk, *Industrial Applications of X-ray Diffraction*, Chapter 25, F. H. Chung and D. K. Smith eds., Marcel Dekker Inc., New York, 531–532 (2000)). A polymorphic bulk crystal of a specific organic/molecular material exhibits multiple bulk crystal structures with different physical and mechanical properties, such as solubility, color, absorption, emission, bulk modulus, etc. An example of a material that exhibits polymorphism is tris(8-hydroxyquinoline) aluminum. Three polymorphs identified as $\alpha$, $\beta$, and $\gamma$ were reported in M. Brinkman et al., *Journal of the American Chemical Society*, 122, 5147–5157 (2000)) with $\alpha$ and $\beta$ exhibiting yellowish-green fluorescence and $\gamma$ exhibiting blue fluorescence when excited with ultraviolet light (M. Braun et al. J. Chem. Phys., 114(21), 9625–9632 (2001)).

The terms "nanomorph" and "nanomorphic particulate" and like terms, are used herein to refer to nanocrystalline particles and nanocrystalline particulates that exhibit changed properties from those of the same particles or particulate in a bulk state. For the purposes of this definition, the same particles or particulates are composed of the same chemical compound or compounds in the same proportions; as determined by starting materials, molecular weights, and elemental compositions, and can be crystalline, semicrystalline, or amorphous. Changes in stereochemistry and the like are not considered. The type and number of nanomorphs exhibited by a particular compound are not direct correlations of the type and number of polymorphs of the same organic/molecular material in bulk crystal. Chemical compounds in nanomorphic materials have molecular weights in the range of 100 to 100,000 daltons.

Organic compounds that form nanocrystalline H- or J-aggregates are used in some silver halide based photographic products. The H- and J-aggregate nanocrystals exhibit unique properties that differ from the properties of the bulk solid. (A. Herz, Photog. Sci. Eng., 18, 323–335 (1974); E. Jelley, Nature, 138, 1009–1010 (1936)) These materials are, thus, nanomorphic.

The following are examples of references disclosing preparation of nanocrystalline materials and compressed fluid printing: U.S. Pat. No. 6,471,327; U.S. Patent Application Publication No. 2003/0121447 A1; U.S. Patent Application Publication No. 2003/0122106 A1; U.S. Patent Application Publication No. 2003/0117471 A1; U.S. Patent Application Publication No. 2003/0107614 A1; U.S. Patent Application Publication No. 2003/0030706 A1; U.S. Patent Application Publication No. 2002/0118246 A1; U.S. Patent Application Publication No. 2002/0118245 A1; all of which are hereby incorporated herein by reference. Other examples are: EP 1 321 303 A1; WO 03/006563 A1; WO 03/053561.

It would thus be desirable to provide authentication methods and apparatus that rely on physical features relating to the preparation of particular materials.

SUMMARY OF THE INVENTION

The invention is defined by the claims. The invention, in broader aspects, provides authentication systems, apparatus, and methods that authenticate an identification marking including a nanocrystalline material. One or more properties of the marking are ascertained to provide a measured profile. The measured profile is compared to at least one member of a closed set of reference profiles. Each reference profile has predetermined values of one or more properties. Each reference profile is unique within the set. At least one reference profile is characteristic of an indicator material in a nanocrystalline morphology and non-characteristic of the same indicator material in a bulk morphology.

It is an advantageous effect of the invention that improved methods and apparatus are provided, in which compressed fluid printing or printing using compressed fluid deposition products provide authentication swatches that present physical limitations against accidental or intentional misuse.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The products of compressed fluid printing and of conventional printing using compressed fluid generated and deposited particulate exhibit some properties that are difficult to imitate by simpler processes. The authentication methods and systems utilize one or more of those properties to provide an authentication. To add additional complexity and resistance to tampering, the different methods and systems can use combinations of properties. In addition, the methods and systems and can be combined with known authentication methods such as use of encodements.

Figure 1:
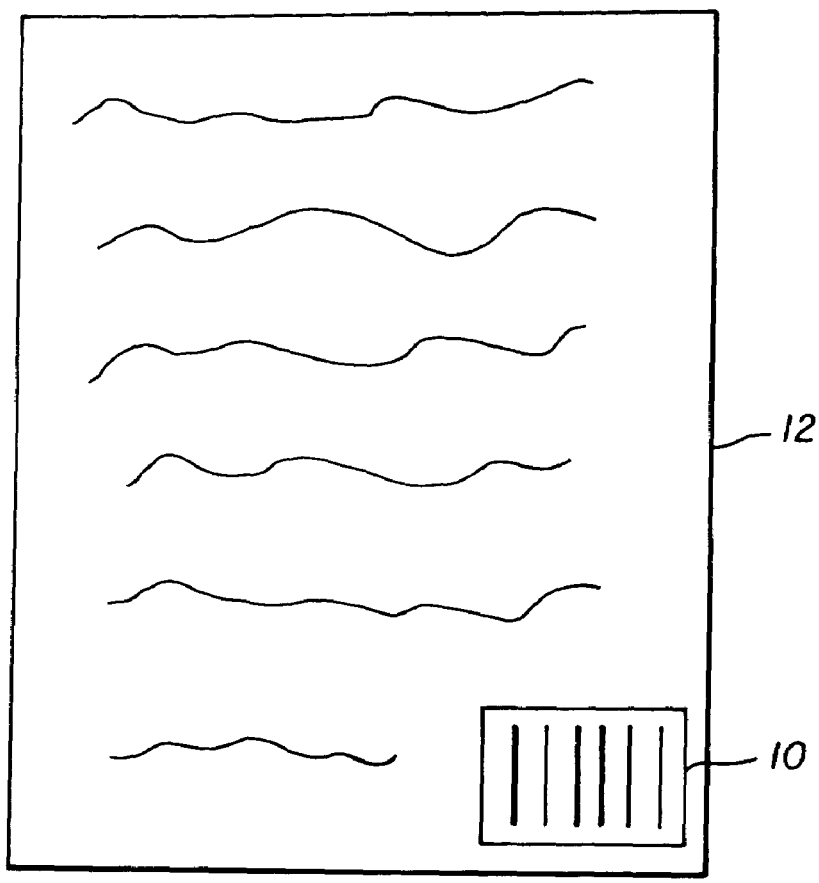
FIG. 1 is a front view of a document bearing an authentication swatch.
Figure 2:
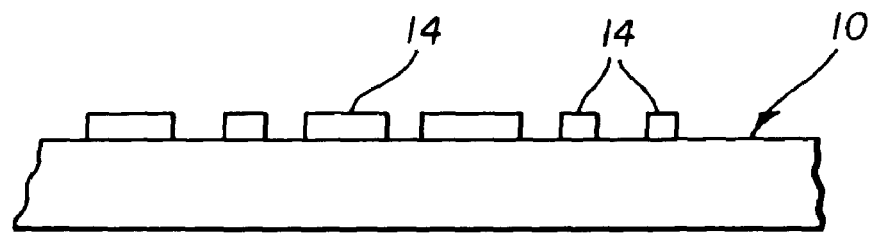
FIG. 2 is a cross-sectional view of the document of FIG. 1.

Referring now to FIGS. 1–2, swatches 10 of compressed fluid printed or compressed fluid generated and deposited particulate can be printed on a substrate 12 that requires authentication, such as currency or negotiable instruments, postage stamps, and the like. The substrates 12 can be readily authenticated by testing for predetermined properties. Those properties cannot be readily faked, since the same compounds used in the identification marking, when used in a bulk state and by conventional printing, have different properties.

The substrate can be any solid material, including an organic, an inorganic, a metallo-organic, a metallic, an alloy, a ceramic, a synthetic and/or natural polymeric, a gel, a glass, or a composite material. The substrate can be porous or non-porous. The substrate can have more than one layer. The substrate can be a sheet of predetermined size or a continuous web or even an article having a complex three-dimensional shape. The substrate can be intended for use by itself or as part of another article. For example, the substrate can be an adhesive label that can be applied to another article.

The methods and systems are generally described herein in relation to authentication of substrates 12 (documents or other items) that have swatches 10, that is, portions of documents or other supports that are dedicated to use for authentication purposes. Swatches are illustrated as having discrete borders. This is not limiting. Swatches can be continuous with the rest of a substrate.

The printed portion of a swatch is referred to herein as an "identification marking 14". The methods and systems are not limited to use with swatches 10 that are localized to a small portion of the substrate, but rather are inclusive of swatches that occupy a large portion or all of the substrate. Such large swatches are typically diffuse and do not interfere with other use of the substrate. On documents and the like, this type of swatch is sometimes referred to as a "watermark". The methods are also applicable to authentications in which the identification marking is removed from a substrate before analysis. For most purposes herein, the removed substrate can be in the form of a collected sample of material.

The methods and systems are also generally described herein in relation to swatches that are compressed fluid printed or conventionally printed using ink or other print media containing a compressed fluid produced component. In the first case, the swatches exhibit properties that are artifacts of the compressed fluid printing process. In both cases, the swatches exhibit nanomorphic properties produced by the compressed fluid printing or depositing. These properties are utilized by the authentication methods and systems. For convenience, the authentication methods and systems are generally discussed herein in relation to a compressed fluid printed swatch that exhibits nanomorphic properties. The methods and apparatus that are also applicable to conventionally printed swatches that contain a compressed fluid produced component, will be apparent from context. The methods and apparatus are also applicable to swatches and taggants that exhibit the required properties for a particular method or apparatus, but are produced by different methods.

Suitable procedures for compressed fluid printing and the preparation of compressed fluid produced particulates are described in the incorporated references and are also presented below, along with preparations of various nanomorphic materials and swatches.

Compressed Fluid Printing and Preparation of Compressed Fluid Produced Particulates Compressed fluid printing and the deposition of compressed fluid particulates starts with the preparation of nanocrystalline materials. In compressed fluid printing, the nanocrystalline particulates are deposited directly on a receiver. In the deposition of compressed fluid produced particulates, the particulates are collected, added to an ink or other print media and are then printed using a conventional printing method and equipment. For convenience, the term "ink" is used herein to refer to all kinds of printing materials including inkjet inks, electrophotographic toner, thermal transfer materials, and the like. The nanocrystalline materials and ink formulations are selected so as to prevent dissolution of the nanocrystalline materials in the ink formulations during handling or use.

The nanocrystalline particulates can be formed by non-reactive processing of bulk state starting material. Starting material can be in a nanocrystalline state rather than a bulk state or in a mixture of both states. This allows for recycling of product, but is ordinarily less convenient than use of bulk materials. (For convenience, a starting material consisting of a single bulk state compound is generally discussed in the following. Like considerations apply to other starting materials.)

The bulk state starting material is dispersible or soluble within a carrier fluid that is in the compressed gas, liquid and/or supercritical fluid phase with a density greater than or equal to 0.1 g/cc at selected temperature and pressure conditions. The carrier fluid is a single compressed fluid or a mixture of compressed fluids. One or more co-solvents or suitable surfactant and/or dispersant material that is capable of solubilizing/dispersing the starting materials can be included.

Prior to deposition, the carrier fluid is maintained at a temperature and a pressure suitable for the dissolution and/or dispersion of the bulk functional material in the compressed fluid. Controlled depressurization of this precursor formulation results in the evaporation of the carrier fluid and the formation of the nanocrystalline particulate.

Materials usable as carrier fluids include, but are not limited to, carbon dioxide, nitrous oxide, ammonia, xenon, ethane, ethylene, propane, propylene, butane, isobutane, chlorotrifluoromethane, monofluoromethane, sulphur hexafluoride, and mixtures thereof. Carbon dioxide is generally preferred in many applications, due to convenient characteristics, such as low cost, wide availability, and the like.

In particular embodiments disclosed herein, the carrier fluid is carbon dioxide. Prior to deposition, the compressed carbon dioxide fluid is maintained at temperatures in the range of from 0 to 100 degrees C. and pressure in the range from greater than 1 to about 400 atm, more preferably 150 to 300 atm.

Carbon dioxide has unique physical properties and in general to date, only a small class of materials are known which have appreciable solubility in $CO_2$. These materials that have appreciable solubility are termed $CO_2$-philic. Materials that are substantially insoluble in $CO_2$ are termed $CO_2$-phobic.

Starting materials that are soluble in compressed $CO_2$ are dissolved. Starting materials that are substantially insoluble in compressed $CO_2$ are dispersed in a continuous compressed $CO_2$ phase with the aid of surfactants having a $CO_2$-philic portion and a $CO_2$-phobic portion having affinity to the starting material. The surfactant included in the precursor formulation is selected to interact with the starting material and the compressed carbon dioxide to form an aggregated system (which can include micellar assemblies, microemulsions) comprising a $CO_2$ continuous phase having a plurality of aggregates of average diameter less than 10 nanometers dispersed therein which comprise surfactant and starting material molecules.

Surfactants are amphiphilic entities that contain a component that is soluble in the bulk phase and a component that is not soluble in the bulk phase. Traditional surfactants used for solubilization in aqueous (or nonaqueous, for that matter) media are classified as comprising hydrophilic and hydrophobic components. The hydrophilic part is the water soluble component and the hydrophobic part is the water insoluble component. Drawing from this terminology, surfactants to be used for forming dispersions of aggregates of $CO_2$-phobic materials in compressed $CO_2$ in the process of the invention are defined as comprising a $CO_2$-philic part that is soluble in the compressed $CO_2$ phase and a $CO_2$-phobic, functional material-philic part that is insoluble in the compressed $CO_2$ phase and which has an affinity towards the functional material. In general hydrophilic components are $CO_2$-phobic but hydrophobic components may or may not be $CO_2$-philic; i.e., criteria for choice (identification) of specific surfactants to be used for solubilization of materials in compressed $CO_2$ cannot be made based solely on the knowledge of surfactants used in traditional liquid (aqueous or non-aqueous) phase systems.

Representative surfactants containing $CO_2$-philic and $CO_2$-phobic portions that may be used in accordance with the invention include those described, e.g., in U.S. Pat. Nos. 5,789,505; 5,944,996; 6,131,421; and 6,228,826; the disclosures of which are incorporated by reference herein. The significance of the $CO_2$-philic portion of surfactants used in accordance with the invention is to introduce the surfactant into the $CO_2$ bulk phase. Fluorocarbons and siloxanes have been identified as two preferred classes of materials which may generally function as $CO_2$-philic components in surfactants (see, e.g., *Supercritical Fluid Cleaning*, J. McHardy and S. Sawan, Eds., Noyes Publications, Westwood, N.J. (1998), pp. 87–120, Chapter 5, referenced above, as well as U.S. Pat. Nos. 5,944,996; 6,131,421; and 6,228,826). Another moiety that has been discovered recently is a poly-ether carbonate surfactant (Sarbu, T., Styranec, T., Beckman, E. J., "Non-Fluorous Polymers with Very High Solubility in Supercritical $CO_2$ down to Low Pressures," Nature (2000), 405, 165). Acetylenic alcohols and diols exhibiting surface-active properties in $CO_2$ are described in U.S. Pat. No. 5,789,505.

Examples of $CO_2$-phobic groups include molecular units containing various functional groups such as amides, esters, sulfones, sulfonamides, imides, thiols, alcohols, dienes, diols, acids (such as carboxylic, sulfonic, phosphoric), salts of acids, ethers, ketones, cyanos, amines, quaternary ammonium salts, and thiazoles, as well as lipophilic, oleophilic, and aromatic polymers or oligomers formed from monomers such as ethylene, alpha-olefins, styrenics, acrylates, ethylene and propylene oxides, isobutylene, vinyl alcohols, acrylic acid, methacrylic acid, and vinyl pyrrolidone. The significance of the $CO_2$-phobic portion of surfactants used in accordance with the invention is that the proper selection of this segment to have affinity to the functional material will enable the formation of aggregates comprised of the $CO_2$ insoluble functional material of interest (whether hydrophilic or hydrophobic) and the surfactant dispersed in the compressed $CO_2$ phase. For dispersing functional materials containing ionic or other hydrophilic groups, the $CO_2$-phobic, functional material-philic portion of the surfactant may advantageously be selected from among known hydrophilic groups, and in particular ionic functional groups.

Examples of commercially available fluorocarbon based surfactants (often perfluoropolyether) which may be useful in the process of the invention, include Fomblin™ (Ausimont Montedison Group), Fluorolink™ (Ausimont) and Krytox™ (Dupont) families of surfactants. Particularly preferred surfactants for use in the invention include Fluorolink 7004™ (Ausimont Montedison Group) and Fomblin MF-300™ (Ausimont). Descriptions and examples of siloxane-based surfactants (often polydimethylsiloxane) that may be used in accordance with the invention include the end-functionalized polysiloxane surfactants described in U.S. Pat. No. 6,228,826.

The starting materials can be selected from species which are appreciably soluble in the compressed carbon dioxide. Appreciable solubility is intended to mean solubility of greater than 0.010 weight percent (wt %), more preferably greater than 0.5 wt %, in compressed carbon dioxide at the temperature and pressure of the precursor formulation. Temperatures are preferably in the range from −100 to +100° C., and pressure in the range from $1 \times 10^{-8}$ to 1000 atm. Such materials may be of the types such as organic, metallo-organic, polymeric, oligomeric, a synthetic and/or natural polymer, and a composite material of these previously mentioned. Starting materials can be, for example dyes or pigments, agricultural chemicals, commercial chemicals, fine chemicals, food items, nutrients, pesticides, photographic chemicals, explosive, cosmetics, protective agents, metal coating precursor, or other industrial substances whose desired form is that of a deposited film, fine particle dispersion, or powder. Dyes and pigments are preferred starting materials for compressed fluid printing and compressed fluid deposited materials.

Additionally, starting materials that are insoluble or sparingly soluble in $CO_2$ can be functionalized using the $CO_2$-philic groups such as fluorocarbons, siloxane and other such $CO_2$-philic moieties, such that they can be dispersed and/or dissolved directly without the aid of a surfactant.

Apparatus that may be used for making the formulation has been disclosed in the pending U.S. patent application Ser. No. 09/794,671, which is hereby incorporated herein by reference. Additional suitable apparatus is described in U.S. Pat. Nos. 4,582,731; 4,734,227; 4,582,731; 4,734,451; 5,301,664; 5,639,441; 6,177,103; 6,299,906; and 6,316,030.

In the apparatus, the starting materials are controllably introduced into a formulation reservoir, preferably in the form of powders. The compressed $CO_2$ fluid is also controllably introduced into the formulation reservoir. The contents of the formulation reservoir are mixed using a mixing device to ensure intimate contact between the starting material, surfactant if used, and compressed fluid. As the mixing proceeds, the starting materials dissolve or are dispersed within the compressed fluid. This dissolution or dispersion process depends upon the starting materials present, the initial particle size and particle size distribution of the starting materials (if supplied as a solid), the temperature, and the pressure within the formulation reservoir. When the dissolution or dispersion process is complete, a thermodynamically stable or metastable state is reached, in which there is little or no settling, precipitation, and/or agglomeration of starting material particles within the formulation chamber unless the thermodynamic conditions of temperature and pressure within the reservoir are changed. The resulting solution or dispersion is also referred to herein as the "ready fluid".

The ready fluid is rapidly depressurized to precipitate the starting material as a nanocrystalline deposit. The compressed $CO_2$ gasifies during the depressurization. Depressurization occurs within a nozzle (described below). Depressurization can occur in vacuum or ambient air or a selected atmosphere.

The size of the precipitated nanocrystalline materials can be adjusted by changing the orifice of the nozzle, temperatures, pressures, flow rate, concentration in the solution/dispersion, and in the case of $CO_2$-phobic materials, the relative concentrations of the surfactant and starting materials.

The precipitated nanocrystalline particulate can be directly injected/deposited on a receiver, that is, compressed fluid printed; or the stream of nanocrystalline particulate can be captured and retained as a free particulate. This can be readily accomplished by directing the precipitating stream of material into a non-solvent liquid. The solvent evaporates immediately or readily to yield the nanocrystalline particulate. The nanocrystalline particulate can then be added to an ink formulation as, in effect, a pigment.

A compressed fluid printing apparatus has a printhead that includes a discharge device having an inlet and an outlet with a portion of the discharge device defining a delivery path. A portion of the discharge device is adapted to be releasably connected to a formulation reservoir, as earlier described. The discharge device is shaped to produce a suitably shaped beam of the indicator material with the fluid being in a gaseous state at a location beyond the outlet of the discharge device. Discharge can be controlled in a manner analogous to drop-on-demand and continuous ink jet printers.

In particular embodiments described below, printers provide different colors or wavelength ranges of different spectral effects. Printers can also be limited to a single spectral range. Printers can also use three or more different "inks". Each "ink" can be limited to a single nanocrystalline material or can combine multiple materials.

Figure 3:
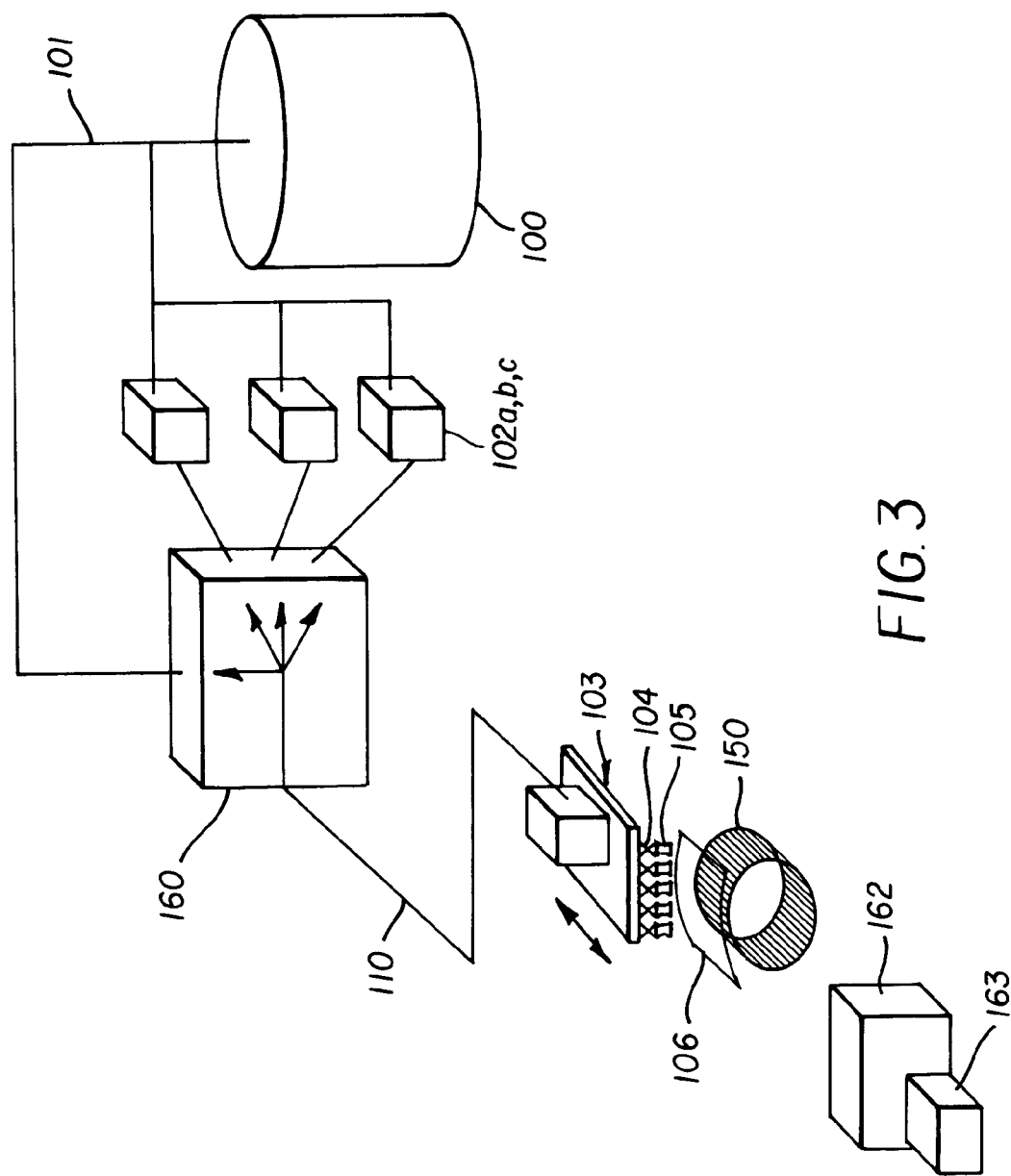
FIG. 3 is a schematic view of an embodiment of a compressed fluid printer.

Referring to FIG. 3, a compressed fluid printing apparatus has a print-head 103, which includes the discharge devices 105 and actuating mechanisms 104. A media transport 150 (illustrated as a drum) positions the substrate 106 adjoining a use position of the print-head 103 during printing. Media transport mechanisms are well known and the specific type used is not critical. For example, the media transport 150 can utilize an x-y translation stage, or series of rollers, in place of a drum. In the illustrated embodiments, the printhead 103 translates in one direction and the drum provides a second axis of motion to create a two dimensional print. As an alternative, the print-head can be moved relative to the substrate.

The system is under high pressure, from a compressed fluid source 100, through tubing 101, 110, formulation reservoirs 102a,b,c, a material selection device 160, to the printhead 103. Tubing can be rigid or flexible, but due to high pressures, it may be desirable to eliminate the flexible tubing 110 because large wall thickness and bend radii may be required. An example of a flexible tubing 110 is Titeflex extra high-pressure hose P/N R157-3 (0.110 inside diameter, 4000 psi rated with a 2 inch bend radius) available from Kord Industrial in Wixom, Mich. This hose may not be suitable in all embodiments. Hoses may be problematic if movement of the printhead is provided, for example, from the use position to a position in a cleaning and calibration station 162.

In this embodiment, the colors are printed sequentially, rather than in parallel. This method has the advantage of using all of the actuating mechanism 104 and discharge device 105 combinations for every color at every pixel site, thus maximizing the resolution of the print head. The print head 103 and media transport 150 prints a first color from formulation reservoir 102a by selecting it with the material selector device 160. The printhead 103 would then translate to the cleaning/calibrating position. The remaining colorant in the line 110 and printhead 103 is then purged into the station 162 by selecting pure compressed fluid 100 with the material selector device 160. The print head 103 then translates back to the printing position located at the media transport 150, the material selector device then selects formulation reservoir 102b, and the second color is printed. The line 110 and printhead 103 are purged as before and the process is repeated until all of the required colors have been printed. Shown are three formulation reservoirs 102a,b,c and the pure compressed fluid. It is recognized that the invention is scaleable to any number of "colors" which might include additional colors to improve gamut or efficiency, precoats, overcoats, etc. This method relies on adequate precision in the mechanical translation of the print head and the substrate translator to maintain proper color registration. An alternative print-head can print from all of the formulation reservoirs at the same time, in the same manner as a color ink jet printer.

A sensor 163 can be provided at the cleaning/calibration station 162 to determine whether the indicator material has been completely purged from the line and for calibrating the printer. Such calibrations are performed when the printer is starting up, when the indicator material or media is changed, before critical printing jobs are performed, or when the printer is out of calibration. The sensor 163 can either examine the stream of material exiting the discharge device, or be used in a secondary operation to look at the densities or colors created by a stream on a piece of test media. Print scanning and correction algorithms for performing printer calibration are well known in the printing industry.

Figure 4:
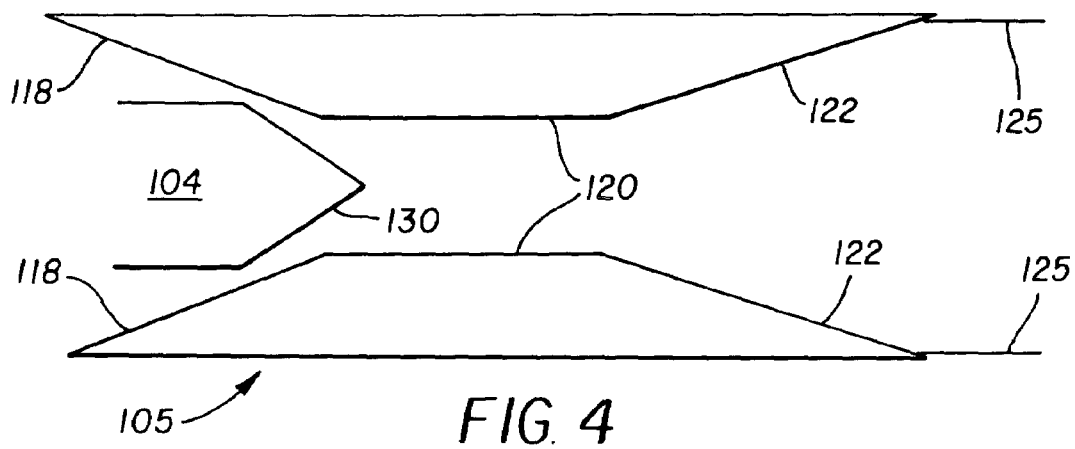
FIG. 4 is a schematic view of the discharge device and actuating mechanism of the printer of FIG. 3, shown in an open position.
Figure 5:
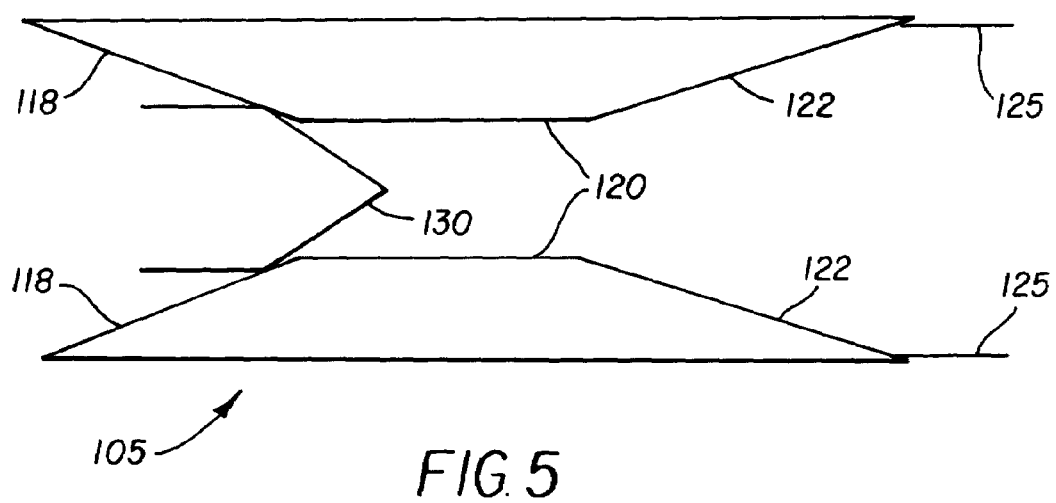
FIG. 5 is the same view as FIG. 4, but shown in a closed position.

In a particular embodiment, discharge device 105 in a print head 103, includes a first constant area section 120 followed by a first variable area section 118 as shown in FIGS. 4–5. A second variable area section 122 diverges from constant area section 120 to the end of discharge device 105. The first variable area section 118 converges to the first constant area section 120. The first constant area section 118 has a diameter substantially equivalent to the exit diameter of the first variable area section 120. Alternatively, discharge device 105 includes a second constant area section 125 positioned after the variable area section 122 (not shown). Second constant area section 125 has a diameter substantially equivalent to the exit diameter of the variable area section 122. Additionally, at least one additional variable area section can be connected to one end of the first constant area section 120. Discharge devices 105 of this type are commercially available from Moog, East Aurora, N.Y., Vindum Engineering Inc., San Ramon, Calif.

Actuating mechanism 104 is positioned within discharge device 105 and moveable between an open position and a closed position and has a sealing mechanism 130, as shown in FIGS. 4–5. In closed position, the sealing mechanism 130 in the actuating mechanism 104 contacts constant area section 120 preventing discharge. In open position, deposition occurs. Actuating mechanism 104 can also be positioned in various partially opened positions depending on the particular printing application, a desired deposition rate, etc. Alternatively, actuating mechanism 104 can be a solenoid valve having an open and closed position. When actuating mechanism 104 is a solenoid valve, it is preferable to also include an additional position controllable actuating mechanism to control the mass flow rate through the discharge device. Actuating mechanism 104 is actable at a plurality of frequencies.

In a preferred embodiment, the diameter of the first constant area section 120 of the discharge device 105 ranges from about 10 microns to about 2,000 microns. In a more preferred embodiment, the diameter of the first constant area section 120 of the discharge device 105 ranges from about 10 microns to about 20 microns. Additionally, first constant area section 120 has a predetermined length from about 0.1 to about 10 times the diameter of first constant area section 120 depending on the printing application. Sealing mechanism 130 can have a variety of shapes, such as conical or disk shaped.

Referring to FIG. 3 again, the compressed fluid printer 205 has components, 100, 102, 103, and 104 that take the chosen carrier fluid and starting materials to a compressed fluid state, make a solution and/or dispersion, and deliver the ready fluid as a collimated and/or focused beam onto the substrate 106 in a controlled manner.

The formulation reservoirs 102a,b,c in FIG. 3 are utilized to dissolve and/or disperse the starting materials in the carrier fluid, with or without dispersants and/or surfactants, at desired formulation conditions of temperature, pressure, volume, and concentration. The formulation reservoirs 102a,b,c in FIG. 3 can be made out of any suitable materials that can safely operate at the formulation conditions. An operating range from 0.001 atmosphere (1.013×102 Pa) to 1000 atmospheres (1.013×108 Pa) in pressure and from −25 degrees Centigrade to 1000 degrees Centigrade is generally preferred. Typically, the preferred materials include various grades of high-pressure stainless steel; however, it is possible to use other materials if the specific deposition application dictates less extreme conditions of temperature and/or pressure.

The formulation reservoirs 102a,b,c in FIG. 3 should be adequately controlled with respect to the operating conditions (pressure, temperature, and volume). The solubility/dispersibility of starting materials depends upon the conditions within the formulation reservoirs 102a,b,c. As such, small changes in the operating conditions within the formulation reservoirs 102a,b,c can have undesired effects on indicator material solubility/dispensability. The starting materials and carrier fluid can be controllably introduced into the formulation reservoirs 102a,b,c. Mixing is provided using a mixing device to ensure intimate contact between all materials.

The process of dissolution and/or dispersion depends upon the materials used, particle sizes and distributions (if solid), conditions of introduction into the reservoir, temperature, and pressure. When the mixing process is complete, the solution/dispersion is thermodynamically stable/metastable, in that the indicator materials are dissolved or dispersed within the compressed fluid so as to be indefinitely maintained as the temperature and pressure within the formulation chamber are maintained constant. This state is distinguished from other physical mixtures in that there is no settling, precipitation, and/or agglomeration of particles within the formulation chamber, unless the thermodynamic conditions of temperature and pressure within the reservoir are changed. As such, the ready fluid can be said to be thermodynamically stable/metastable. The ready fluid is controllably released from the formulation reservoirs 102a, b,c through a material selection device 160 which controls which of the thermodynamically stable/metastable mixtures or formulations will be allowed to flow to the discharge device 105 via the actuating mechanism 104. The material selection device 160 as shown in FIG. 3 has four inputs and one output. The inputs are connected to the formulation reservoirs 102a,b,c, and compressed fluid source 100. In a simple form, the material selection device can be 4 individual devices of the type used on the printhead 104 which, as discussed are commercially available from Moog, East Aurora, N.Y., Vindum Engineering Inc., San Ramon, Calif. The output of these four devices would then be connected by way of a plenum to the flexible hose 110.

During the discharge process, precipitated indicator materials are propelled toward the substrate as a beam, which is preferably focused and/or collimated. When the size of the precipitated and/or aggregated indicator material stream is substantially equal to an exit diameter of the discharge device 105, the precipitated and/or aggregated indicator material stream has been collimated by the discharge device 105. When the sizes of the precipitated and/or aggregated indicator material stream is less than the exit diameter of the discharge device 105, the precipitated and/or aggregated indicator material stream has been focused by the discharge device 105.

Multiple discharge devices 105 can be fabricated together to form a print head that provides multiple beams. Discharge devices can be controlled to provide for evaporation of the compressed fluid inside and/or outside the discharge device 105.

The distance of the substrate 106 from the discharge device 105 with an actuating mechanism 104 is chosen such that the compressed fluid reaches a gas phase prior to reaching the substrate 106. Hence, there is no need for a subsequent receiver drying processes. The substrate 106 can be electrically or electrostatically charged, such that the location of the indicator material in the receiver 106 can be controlled.

It is desirable to control the velocity with which individual particles of the indicator material are ejected from the discharge device 105 with an actuating mechanism 104. As there is a sizable pressure drop from within the printhead 103 to the operating environment, the pressure differential converts the potential energy of the printhead 103 into kinetic energy that propels the indicator material particles into the substrate 106. At acceptable kinetic energies, particles embed in the receiver at or below a surface layer. At unacceptable kinetic energies, particles pass through the receiver.

Within the previously discussed printer configurations gray scale levels for each color can be provided. It is possible with compressed fluid printing to achieve a nearly infinite number of colors. These colors can be modified from their nominal values by a lookup table in response to the calibration performed at the cleaning and calibration station 162. With variable print durations for each colorant determined by the actuating mechanisms, variable amounts of colorant can be delivered to every pixel printed. Such a result could also be achieved through other variables in the compressed fluid system, such as colorant concentrations. Varying the dot area is also a way to achieve differing levels of color.

Figure 15:
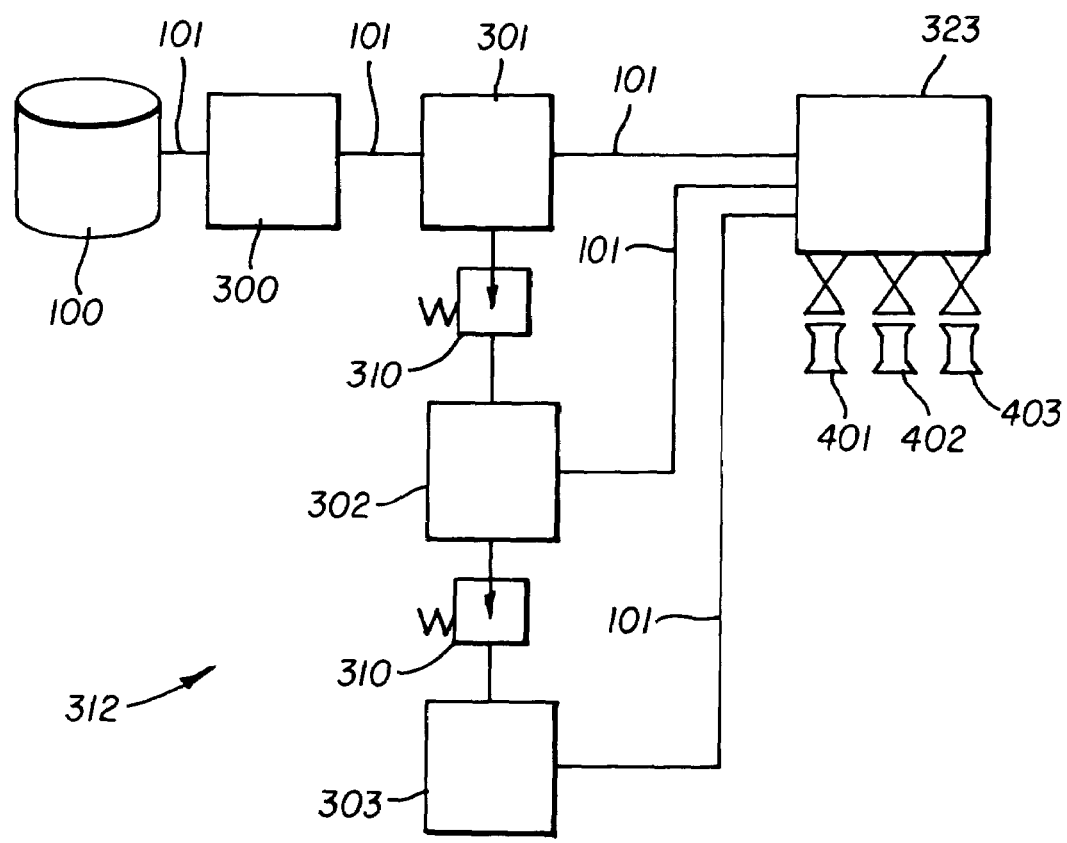
FIG. 15 is a schematic view of another embodiment of a compressed fluid printer.

Referring now to FIG. 15, another compressed fluid printing apparatus can be used to produce swatches having a continuously variable nanomorphic property. For example, reflected spectral peaks of an marking material(s) can be varied by varying pressure in one or more formulation reservoirs and/or during material ejection to create an article having multiple colors and/or multiple color shades using one marking material. Varying other process parameters, for example, temperature, and material (solute and/or dispersant) concentration, can produce similar effects. (For convenience the following discussion of FIGS. 15–16, refers only to reflected spectral peaks. Other nanomorphic properties that are dependent upon the same factors can be varied in the same manner.)

Referring again to FIG. 15, a delivery system 312 includes a source of compressed fluid 100, a main formulation mixing tank 300, a highest pressure delivery tank 301, a medium pressure delivery tank 302, and a lowest pressure delivery tank 303. Fluid source 100 and tanks 300, 301, 302, 303 are connected in fluid communication through high pressure tubing 101. Delivery system 12 enables the dissolution and/or dispersal of a selected marking material into a compressed fluid having a density greater than 0.1 g/cc$^3$.

Delivery system 312 supplies a printhead 323 with the solution and/or dispersion of the marking material under different pressure conditions, the ejection of which producing different colors from the same marking material. In the embodiment shown in FIG. 15, three tanks 301, 302, 303 are shown in order to supply the printhead with marking material at three different pressures. Additional tanks or fewer tanks can be incorporated into the delivery system 312 as desired.

During deposition, the marking material ejected through nozzle 401 (exemplary of one or more nozzles connected to the highest pressure delivery tank 301) produces a first color marking material. The marking material ejected through nozzle 402 (exemplary of one or more nozzles connected to the medium pressure delivery tank 302) produces a second color marking material. The marking material ejected through nozzle 403 (exemplary of one or more nozzle connected to the lowest pressure delivery tank 303) produces a third color marking material. In order to reduce the pressure in the medium pressure tank 302 and the lower pressure tank 303, commonly available condition controlling devices 310 are used. In the case of a pressure regulated system, these devices are pressure regulation valves. One type of suitable condition controlling device 310 is commonly referred to as a pressure reduction valve, and is commercially available from, for example, Keidel Supply Co., Norwood, Ohio; Tyco valves and Controls, Houston, Tex.; etc. In this configuration, delivery system 312 is self-regulating in that pressures in the individual tanks 301–303 can be maintained at optimum levels even though pressure variations typically occur as the material is being ejected. Additionally, although condition controlling with respect to pressure has been discussed with reference to a pressure reducing valve, there are other ways of controlling (for example, generating and/or reducing) pressure. For example, individual sources of compressed fluids could be supplied to the system at different pressures.

If the system is designed around temperature, the condition controlling device 310 can be a temperature control device or any other suitable condition controlling mechanism. For example, a temperature controlling device can include heating mechanisms (heated coils, etc.) and/or cooling mechanisms (water jackets, etc.). Similarly, if the system were operating based on solute concentration, the delivery tanks would each contain various concentrations of the marking material.

Figure 16:
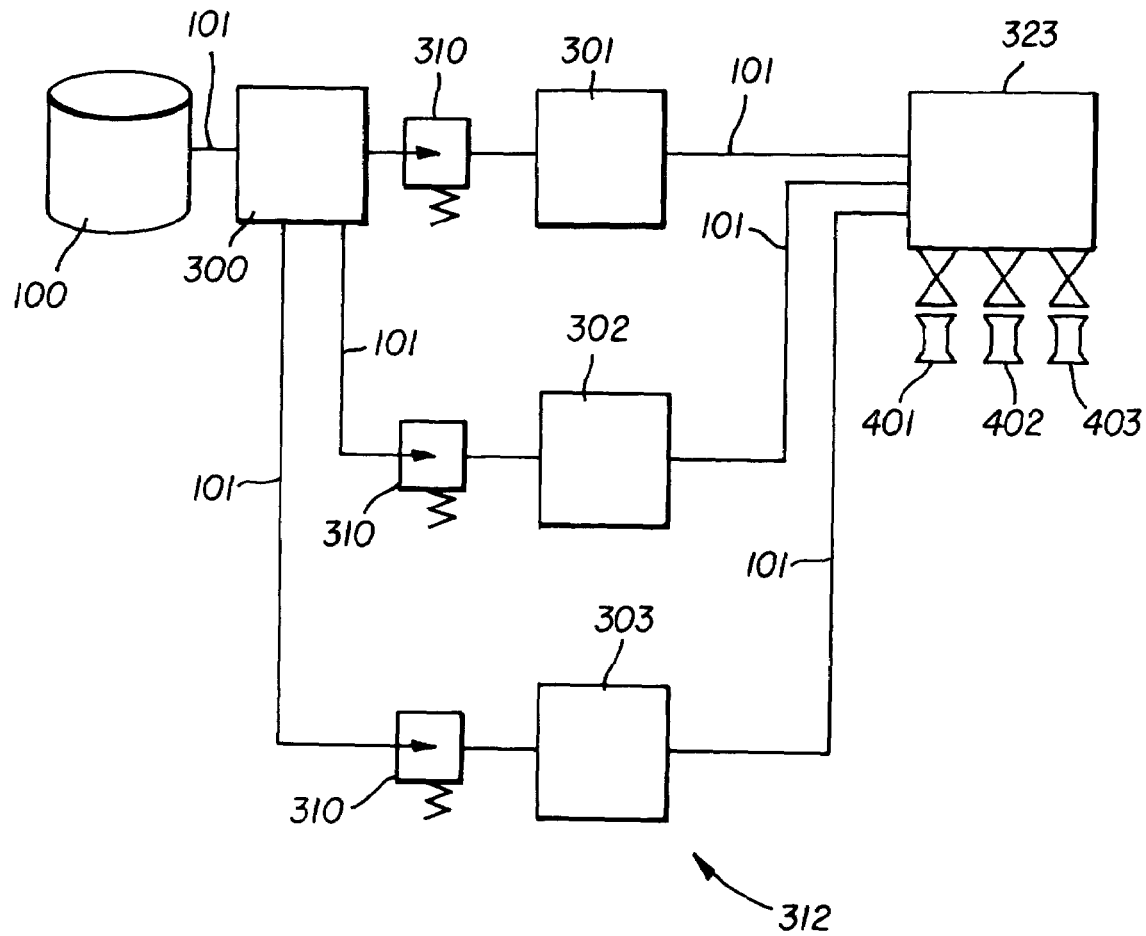
FIG. 16 is a schematic view of yet another embodiment of a compressed fluid printer.

Delivery system 312 can be modified, as shown in FIG. 16, using constant pressure delivery tanks 301–303, and condition controlling devices 310 that can be adjusted during operation to provide additional pressures for producing more colors. Pressure variation can also be used to increase color gamut and/or color shades depending on the application. The delivery system can also be modified to also continuously vary the formulation. Other configurations are possible. For example, different formulations can be printed in succession or at the same time. The depth of marking material penetration into substrate 106 can also be varied. (See, for example, U.S. Patent Application Publication US 2003/0030706 A1.)

Swatches

Figure 6:
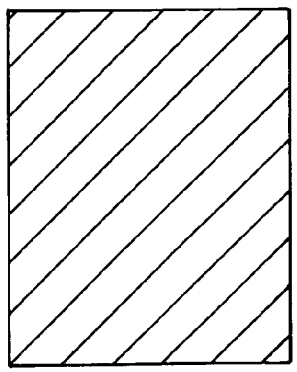
FIGS. 6–10 are examples of different swatches.
Figure 7:
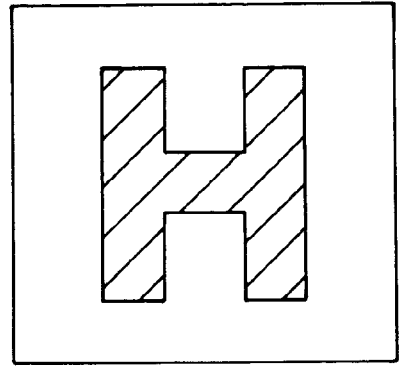
Figure 8:
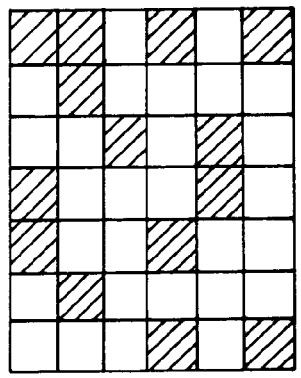
Figure 9:
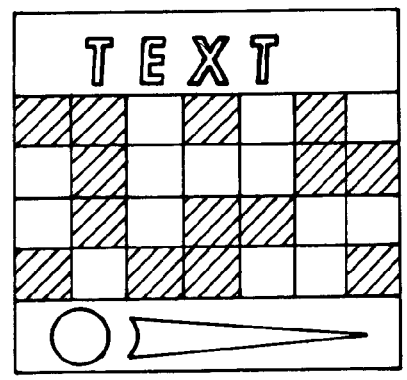
Figure 10:
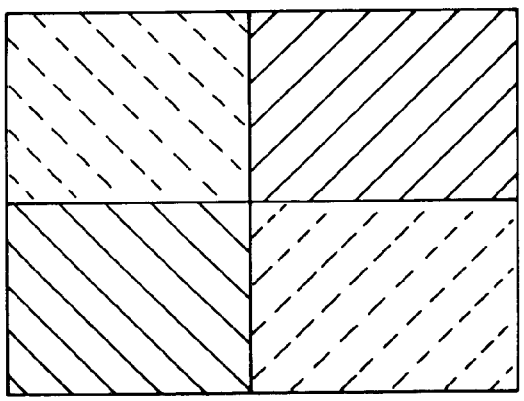

FIGS. 6–10 illustrate some of the different types of swatches that can be used by the authentication methods and systems. FIG. 6 is a continuous and uniform deposit of the nanocrystalline material. This particular swatch provides yes/no information as to the presence of the identification marking. FIG. 7 is a uniform color and gray scale deposit that is imagewise modulated during printing to provide human readable information, such as a symbol or alphanumeric message. This swatch provides a more noticeable indication of the location of the identification marking and carries more information than the swatch of FIG. 6. The modulation can also use gray-scale changes or color changes or changes in materials. FIG. 8 illustrates (in simplified form) a swatch that is modulated in the same manner to form of a machine-readable two-dimensional bar code. This swatch can contain a relatively large amount of information. FIG. 9 illustrates a swatch having a combination of a machine readable barcode, symbol, and an alphanumeric string. The barcode and alphanumeric string can be encrypted to provide an additional level of security. FIG. 10 illustrates a swatch in the form of a rectangular pattern of four squares. Each square has a different nanocrystalline material and/or a different nanomorphic/compressed fluid printing characteristic. This feature, continuous or stepwise variation of a nanomorphic/compressed fluid printing characteristic, can be used in any combination with the features of the swatches of the earlier figures to enhance security or carry additional information, or both.

Preparation of Specific Swatches

A formulation reservoir was loaded with 100 mg of copper phthalocyanine, hereafter referred to as CuPc, and 196 g of $CO_2$. The reservoir was then heated to 60 degrees C. at 350 atm. The mixture of $CO_2$ and CuPc was then stirred vigorously to dissolve all of the solid material in $CO_2$. After the material was completely dissolved in compressed fluid CO2, the stirrer was turned off and the system was kept unstirred for at least 5 minutes. A glass vial containing 15 ml of isopropyl alcohol, hereafter referred to as IPA, was located just under the opening of a convergent divergent nozzle inside an expansion chamber. The glass vial was then temporarily covered with a plastic sheet, which served as a shutter to prevent exposure to any sprayed material. A needle valve connected to the reservoir was then opened to obtain a minimum flow of steady spray, determined by visual observation. This process usually took less than a minute. After the fluid flow had become steady, the plastic sheet was removed and the jet spray containing precipitated CuPc was directed into the IPA vial for 5 minutes. The pressure inside the chamber was maintained constant throughout at 350 atm. CuPc, which is insoluble in IPA, was by this process, dispersed in IPA to create a stable dispersion.

The CuPC dispersion was printed on a quartz slide (2.5 inches×2.5 inches) as follows. The quartz glass plate was held flat at distance of 2.25 inches from the tip of the nozzle. The quartz glass plate was then temporarily covered with a plastic sheet, which served as a shutter to prevent exposure to any sprayed material. The needle valve was then opened to obtain a minimum flow of steady spray, determined by visual observation. This process took less than a minute. The shutter was then removed and the quartz glass plate was exposed to the spray resulting in deposition of CuPc onto the quartz substrate. The deposition process was continued for 5 minutes after which the needle valve was closed. The quartz plate thus coated with CuPc was then stored in a desiccator.

Reference Profile Sets

Figure 11:
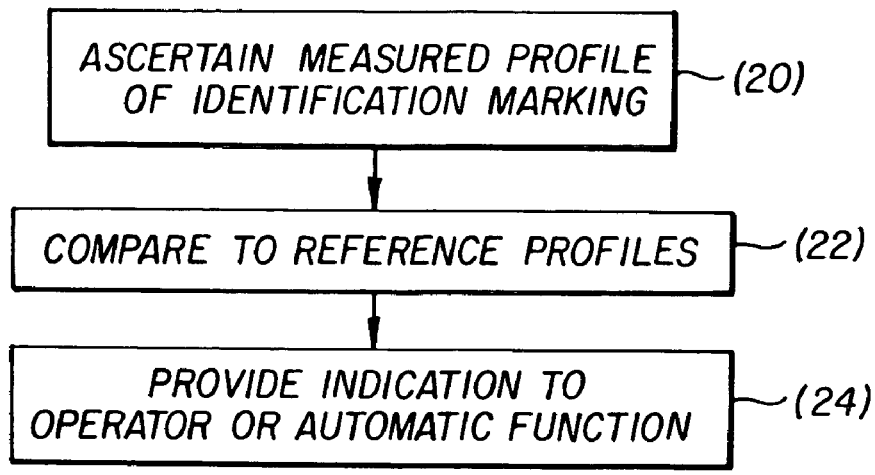
FIG. 11 is a flow chart of an embodiment of the method.
Figure 12:
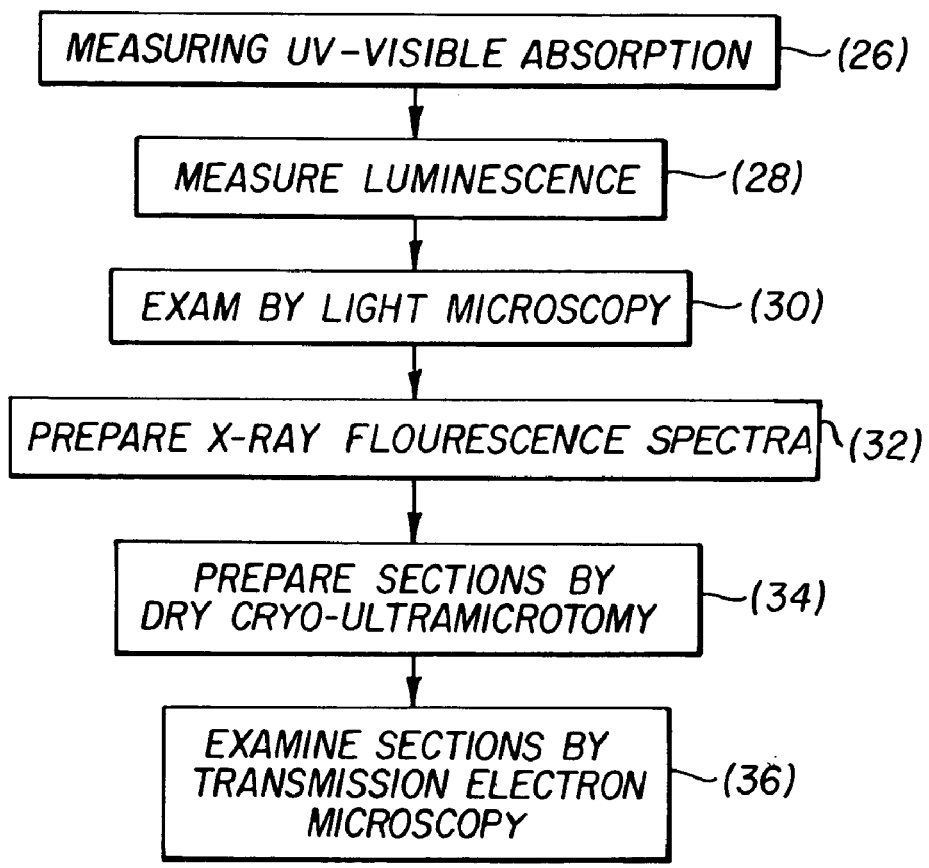
FIG. 12 is a detailed flow chart of the ascertaining step of the method of FIG. 11.
Figure 13:
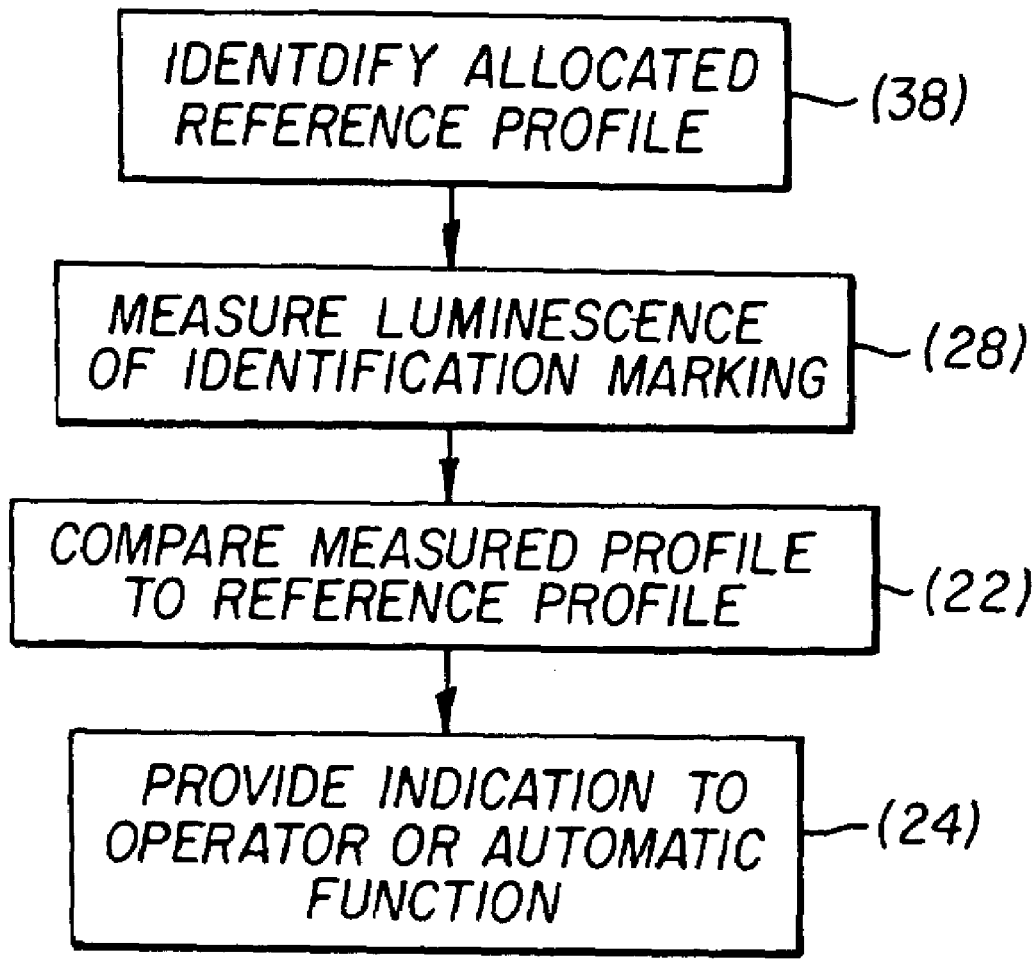
FIG. 13 is a flow chart of a modification of the method of FIG. 11.

Referring now to FIGS. 11–13, in the authentication methods, one or more properties of an identification marking are ascertained (20) to provide a measured profile. The measured profile is compared (22) to at least one member of a closed set of reference profiles. Each reference profile has predetermined values of the measured properties. Each reference profile is unique within the set. At least one of the reference profiles is characteristic of an indicator material in a nanocrystalline morphology and non-characteristic of the same indicator material in a bulk morphology.

Each profile can include a full analysis of one or more properties or a reduced data set, relative to the total available information regarding a property. For example, a spectrum can be provided for a luminescence property or, alternatively, a profile can be limited to an intensity at a particular wavelength or wavelengths.

In the comparison step, the value of the measured property is compared, iteratively, to each of the members of the set of predetermined reference profiles until a match is made or no match can be found. The comparisons can be performed by the operator or can be automated. A comparison provides a match if a measured property is within a predetermined range based upon sampling error, instrument tolerances, and the like.

An automated comparison of the measured value to the set of predetermined values can be provided by a programmed personal computer, which receives data directly from the equipment that makes the measurements. Computer software and hardware suitable for this purpose are well known to those of skill in the art.

In the comparison, a measured profile matches or does not match a member of the set of reference profiles. In response to the match or lack of match, an indication is provided (24) to an operator or as an input in an automatic function. The indication to an operator can be provided in whatever manner is convenient. For example, an indication can be provided to the operator visually by a text message on a display and/or by an audible indication. The provision of an indication to an automatic function can be in the form of a logical flag that terminates a procedure or initiates an alternative procedure. An example of an automatic function is the acceptance or return from a vending machine of a submitted ticket or paper currency based on a match/no match indication.

The same indication can be provided for a match to any member of the set of reference profiles or different indications can be provided for matches to different reference profiles. The latter approach can be used as an efficient way to identify expected fakes, since comparisons are halted when a match is obtained. For example, it might be expected that a fake would substitute a bulk morphology of a material for the nanocrystalline morphology. In this case, a match to a reference profile of an indicator material in the nanocrystalline morphology provides an indication that, in effect accepts a swatch as authentic, while a match to a reference profile of the same indicator material in the bulk morphology provides an indication that a swatch is faked.

The set of reference profiles is closed so as to provide assurance that a particular identification marking is or is not within a set. This assurance is subject to the limitation that a damaged or degraded marking is likely to not match. The number of different identification markings that can be provided is very large. The size of a particular set of reference profiles is a practical determination, based upon such factors as the required level of security, time available for comparison, and precision of components used to obtain the measured profile. In the simplest case, the set of reference profiles has one member. This might be used to provide an additional level of security for a quality indicator on a packaged product or for an encrypted alphanumeric access code.

A reference profile set can be limited to a single-member, or to a single indicator material in a nanocrystalline morphology along with one or more indicator materials in a bulk morphology. Alternatively, all of the indicator materials in a reference profile set can be in a nanocrystalline morphology.

The members of a set of reference profiles are predetermined for a particular authentication system. Determinations of which indicator materials to use in a set can be made empirically, based upon the requirements presented by the expected use of authenticated substrates and the limitations of the testing equipment provided in the system. An indicator material is acceptable for a particular system only if that material, in a nanocrystalline morphology, can be readily distinguished from the bulk morphology form of the same indicator material, from other indicator materials used in the system, and from materials that would likely be used by a counterfeiter to imitate a swatch provided by the system. The latter materials can be evaluated partly on the basis of cost. A counterfeiter is unlikely to use materials that would be so economically expensive as to render a fake more expensive than the original.

Measured Profile

A measured profile has values for one or more properties that distinguish an indicator material in a nanocrystalline morphology from other materials. The property or properties can be a characteristic of the nanocrystalline particulate by itself or in combination with the substrate. An example of the former is a particular luminescence pattern. An example of the latter is an embedment pattern. (Both are discussed in detail below.)

The property or properties measured can fully characterize the indicator material of the identification marking or can characterize the identification material only as to the members of the set of reference profiles. A consideration here is the level of confidence required by the user. A property that is possible to imitate may be acceptable in some situations, if an imitation is sufficiently difficult to devise or impractical to use. An example of this is that the marking would be costly to imitate and is used on a product that is relatively inexpensive.

The measured property or properties can be uniform characteristics of the identification marking or can be modulated along one or more dimensions of the identification marking so as to carry additional information, such as indicia or a symbology. The matching of the measured value to the appropriate predetermined value can require a match of both the property and the modulation or the modulation can be used as an independent authentication feature. The latter requires that the modulation of the property be visible to the user or be machine readable independent of the procedures used to measure the value of the property. The modulation can also simply provide a decorative function, if desired. Specific examples of modulated properties are a size profile modulated along the longest dimension of an identification marking and modulation of a luminance wavelength along two dimensions of an identification marking to provide a two-dimensional barcode.

The properties can also combine features. For example, a property can be the extent of similarity of a spatial modulation of a luminescence wavelength and the spatial modulation of a size profile. In this case, the matching is the extent of similarity of the two profiles to a predetermined value for an extent of similarity.

Nanomorphic Luminescence

In some of the embodiments, luminescence of the indicator material is measured. In those embodiments, the nanocrystalline morphology indicator material exhibits a nanomorphic luminescence pattern, which differs from a corresponding luminescence pattern of the bulk morphology of the same material. It is preferred that the nanomorphic luminescence not be readily imitated by dye or other non-particulate material.

The term "luminescence pattern" is used herein to refer to a complete luminescence spectrum for a particular species at a particular excitation wavelength or to a collection of such spectra at different excitation wavelengths or to one or more parts of such a spectrum or spectra. In practice, a luminescence pattern is preferably limited to portions of spectra providing a characterization of a particular species.

The term "nanomorphic luminescence" is used herein to refer to a luminescence that is associated with a nanocrystalline morphology of the identified chemical compound and is non-characteristic for, that is, incompatible with, a bulk morphology of the chemical compound.

In some embodiments of the methods, the measured profile is a luminescence pattern of the identification marking and the comparison is made to reference profiles, which are limited to or include predetermined luminescence patterns for the indicator materials.

TABLE 1

| Material | Excitation wavelength (nm) | Bulk emission wavelength (nm) | Nanomorphic emission wavelengths (nm) |
|---|---|---|---|
| TBADN | 375 | 435 | 415, 430, 458 |
| DCJTB | 490 | 655 | 610, 645 |
| C545T | 470 | 530, 570 | 645 |
| aminocoumarin (2-1) | 360 | 462 | 520 |
| triarylpyrazonlines (1-1) | 360 | 415 | 425 |
| triarylpyrazonlines (1-3) | 340 | 430, 440 | 450, 470, 510 |
| 1,8-napthalimides | 360 | 424, 472, 484 | 452, 462, 472 |
| Alq3 | 390 | 532 | 496 |
| TNB | 360 | 442 | 416, 434, 460, 494 |
| copper phthalocyanine | 360 | 750 | 416, 440, 468 |

TABLE 1-continued

| Material | Excitation wavelength (nm) | Bulk emission wavelength (nm) | Nanomorphic emission wavelengths (nm) |
|---|---|---|---|
| Rubrene | 360 | 560, 598 | 460, 568, 598 |
| CFDMQA | 360 | no emission | 560, 592 |

Table 1 lists a number of compounds, in which nanomorphic luminescence has been observed. Characteristic peaks, which can be utilized as luminescence patterns, are indicated for each compound in Table 1. Examples of procedures for the preparation of compressed fluid printing formulations for some of these materials are disclosed in U.S. Patent Application Publication No. 2003/0121447 A1 and U.S. Patent Application Publication No. 2003/0122106 A1, both published Jul. 3, 2003.

Table 1

The luminescence pattern of the identification marking is measured by spectroscopy. Suitable equipment for this purpose is dependent upon the nature of the luminescence measured and the required excitation radiation. An example of a suitable spectrometer for some embodiments is a LABRAM integrated Raman spectroscopy system from Jobin-Yvon Inc. of Edison, N.J.

The nanomorphic luminescence can be uniform throughout the identification marking or can be different in different portions of the marking. The difference can be an intentional modulation that provides an additional security feature. The modulation can be a human readable indicia or decorative graphic that can be checked, as an additional level of authentication, by directing a light having an appropriate excitation wavelength at the swatch. A machine readable symbology and/or human readable encodement can be used instead of a graphic or indicia to add additional security. Detection of a modulation is a function of the resulting power of the detector used. If necessary, the size of the identification markings can be increased, to allow for better modulation. This approach is impractical in some cases, such as stamps, but is practical for large items, such as shipping boxes.

The ink formulation used for an identification marking can be limited to one compound that exhibits a nanomorphic luminescence or can include more than one such compound. The latter is subject to the limitation that the combined luminescence produced can be discriminated from a bulk state luminescence, within the level of confidence required by the user. The same considerations apply to ink formulations, in which other, non-nanomorphic species that also luminesce. For example, a nanomorphic particulate can be mixed with a particulate of the same compound in the bulk state. Such a formulation is usable to the extent that the luminescence pattern of the formulation can be discriminated from the luminescence pattern of the bulk state material. Similar considerations apply to non-luminescent materials in the ink formulation. For example, an ink formulation should not have such a high relative percentage of non-luminescent pigment that emission of nanomorphic luminescence is blocked within the identification marking. The ink formulation used for an identification marking should be such that the additives used to formulate such ink, preferably do not alter or destroy the nanomorphic luminescence characteristic of the chosen material.

Identification

The method utilizes a closed set of reference profiles, all of which are predefined and known. In some embodiments, an allocated reference profile is identified, either individually or as a member of a group, prior to the comparison of the measured profile and reference profiles. In this case, the comparison step is limited to comparing the measured profile with a single or small number of reference profiles. This can greatly reduce the time required for a comparison, particularly if the set of reference profiles has a large number of members.

The manner of identifying the reference profile or profiles allocated to the identification marking is not critical. The simplest approach is providing an identifier for the particular compound on or in association with the swatch. The identifier is read and, optionally, decrypted and/or referenced to a look-up table.

The term "look-up table" refers to both a complement of logical memory in one or more computing devices and to necessary equipment and software for controlling and providing access to the logical memory. The "look-up table" is not limited to a database that stores associated pairs of values, but rather is inclusive of an algorithm or algorithms that provide a similar function for a limited set of values. The look-up table is provided as a portion of memory in one or more computing devices. The referenced look-up tables discussed herein can be provided on-site or can be remotely accessed through a network.

The complexity of the identifier used is a function of the number of compounds in the set and any required security for the identifier. For example, the identifier can specify the chemical name of an indicator material. The name can be in plain text or encrypted. The identifier can also be a number or other alphanumeric value that points to a value in a look-up table. The identifier can be human readable or machine readable or both. Symbologies such as two- and three-dimensional barcodes can be used.

The identification can be limited to a designation of a particular reference profile or group of profiles. A further identification of a particular indicator material need not be present in the authentication system, since the comparison is limited to a reference profile. With an automated comparison procedure, the reference profile can be kept inaccessible to an operator.

The identifier is not limited to a printed marking. The identifier can be provided by an included memory, such as a magnetic stripe or the electronic memory of a radio-frequency powered identification transponder. An example of such a transponder is the inlay transponders marketed by Texas Instruments Incorporated, of Dallas, Tex., as Tag-it® Inlays. The term "reading" and like terms, are used herein in a broad sense that is inclusive of human reading, barcode scanning and interpretation, memory accessing, and the like.

A readable identifier can be provided by the identification marking that provides the nanomorphic luminescence. In this case, the deposit of the indicator material in the swatch is modulated in one or more directions along the identification marking. In effect, the indicator material can be used as a dye or pigment to provide the indicia or symbology. Modulation can be monochromatic or gray scale, reflecting presence or absence or variable amounts of the indicator material along the identification marking. Alternatively, the modulation can be provided by a change in the wavelength of the luminescence of the indicator material, that is, by a change in the nanomorphic luminescence. This can be provided, for some nanomorphic compounds by changing compressed fluid deposition conditions, such as pressure.

The modulated luminescence pattern is read with equipment that provides a localized luminescence spectra along the identification marking in the one or two directions.

The identification of the indicator material is not limited to reading an identifier. The identifier can be provided in any form that communicates the necessary information to identify the indicator material. For example, the identifier can be a color code using one or more pigments or dyes in the swatch. A material having a characteristic luminescence can be used as the identifier. For example, a bulk form of a particular compound can be used as the identifier for the nanomorphic form of the same compound, if the bulk material has a luminescence pattern that is easily differentiated from those of other members of the set of indicator materials.

The identification of the indicator material can be a chemical characterization to the extent necessary to establish which member of the predetermined set of indicator materials is present. A wide variety of procedures and equipment can be used for this purpose, as is well known to those of skill in the art.

Similarly, an indicator material can be identified by determining a physical property, such as absorption or reflectance. The identification procedure can be the preparation of an ultraviolet-visible absorption spectrum. With some indicator materials and required confidence levels such a spectrum can be used in place of a luminescence determination or other test, since a nanocrystalline morphology indicator material will show a shift in a major absorption peak relative to the bulk morphology of the same material. In particular embodiments, further testing in combination with the absorption spectrum provides the measured profile for the comparison to the reference profile or profiles. The absorption peak of the spectrum can also identify an excitation wavelength for luminescence measurement that can be used to provide a comparison test within the group of reference profiles.

In some cases, the absorption spectrum may be all or part of a measured profile that is compared to the reference profiles. This presumes a shift in the absorption spectrum in the nanomorphic indicator material relative to the bulk morphology indicator material.

The excitation cross-section of a security material can be determined by placing the example at the sample port of a spectrophotometer equipped with an integrating sphere (reflectance accessory). For example, a Hitachi U4001 UV/Vis/NIR spectrophotometer with a Labsphere RSA-HI-40 attachment can be used. The reflectance spectrum is then obtained over the near ultraviolet and entire visible spectrum (250–700 nm) with 1 nm resolution. The spectrum is then converted using the Kubelka-Munk equation to K/S data, where K is the absorption coefficient. The optimal excitation range can then be chosen from the regions of maximum absorption.

A particularly convenient approach that combines the identification step with the measurement of luminescence into a continuous procedure that can be performed by a single instrument is micro-luminescence with micro-Raman spectroscopy. An example of a suitable device for this purpose is a Jobin Yvon LABRAM integrated Raman spectroscopy system. Procedures for use of equipment of this type are well known to those of skill in the art.

A specific example of the use of an integrated Raman spectroscopy system is the following. Materials were tested in the form of unmodulated authentication swatches on a glass or fused silica substrate. The indicator material used in the authentication patches was Duasyn Acid Blue Dye, which is a triphenylmethane dye and has the chemical formula:

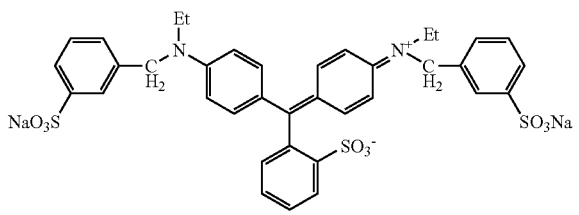

Micro-Luminescence and Micro-Raman spectra were obtained with a Jobin-Yvon LABRAM integrated Raman spectroscopy system. Excitation light at 488 nm or 514.5 nm from an Argon ion laser was focused onto the swatches with a MSPlan 50× or 100× microscope objective, providing an illuminated spot size of about 1 micron. The luminescence or scattered light was detected through a 100–300 micron slit, yielding a detected resolution better than 0.5 nm or 4 cm$^{-1}$. Swatches prepared with bulk state indicator material exhibited Raman lines characteristic of the starting material and, when excited at 488 nm, exhibited a primary luminescence peak at 758 nm. Swatches prepared by compressed fluid printing, had major peaks at both 543 nm and 670 nm.

The procedure was performed similarly, using copper phthalocyanine (CuPC). Visible crystals of the bulk state powder showed narrow Raman lines at wavelengths less than 565 nm, when excited at 514.5 nm. After being dispersed in liquid $CO_2$ and then deposited on glass using compressed fluid printing, some particles greater than 1 micron in size were evident under 100× optical magnification in the identification markings. The Raman spectra of these particles invariably showed the characteristic Raman lines of CuPC. In areas of the same film where no microscopic particles are evident under 100× magnification, no Raman lines were observed and the film emitted in a new broad luminescence band at 568 nm.

Mass spectroscopy can be used to identify an indicator material in terms of either a molecular weight or a molecular weight range. The members of a set of indicator materials can be selected so as to provide unique values, when tested under particular criteria and conditions. A convenient procedure is secondary ion mass spectrometry (SIMS). This procedure can be performed directly on the swatch, without first extracting the indicator material or otherwise preparing the swatch. In addition to molecular information, some depth and position information can be obtained using SIMS. The techniques and equipment of SIMS are well known to those of skill in the art and are described in: Newman, A. Anal. Chem. (1996) 68(21) 683A, Handley, J. Anal. Chem. (2002) 74(11) 335A, Day, R. J; Unger, S. E.; Cooks, R. G. Anal. Chem. (1980) 52(4) 557A). An example of a SIMS instrument suitable for most purposes is a TOF SIMS IV, marketed by IONTOF GmbH, of Muenster, Germany.

SIMS is performed by exposing the analyte to a beam of high-energy ions. This process leads to the ejection of both neutral and charged species. The charged species can be analyzed by any of the various types of mass spectrometer available and analytical information recorded. A variety of SIMS techniques can be performed on a given sample. Static SIMS is performed using a low incident ion flux, resulting in the formation of molecular ions, which can be used to identify the molecular composition of the materials. Dynamic SIMS uses a higher incident ion flux, which erodes the analyte surface. This process can be used to measure the depth profile of the analyte(s), or can be used to etch through a material to expose analyte(s) for static SIMS. Imaging SIMS rasters the incident ion beam across the surface, producing a map of the species present. When imaged, a 3-coordinate map of the analyte is produced. Various combinations of the SIMS experiments can thus be utilized to identify analyte(s) on the surface, near the surface, or buried in a sample.

Materials used for identification marking can be mapped and identified with SIMS techniques. If the authentication indicator material is located on the surface of the material that has been marked, static SIMS can be used to identify the material used to mark, while imaging SIMS can provide a map of the identification marking on a microscale. If the authentication indicator material is embedded at the surface of the material that has been marked, dynamic SIMS can remove a sufficient amount of the material that has been marked to allow static and imaging SIMS to identify and map the analyte. If the authentication indicator material is buried in the substrate, dynamic SIMS can measure how deeply the analyte is buried and expose the analyte to identification and mapping by the other techniques.

Another property that can be measured is the presence of a particular element. X-ray fluorescence (XRF) can be used to non-destructively characterize the materials and is convenient for identifying the presence of elemental species having an atomic number equal to or greater than 11, and in some instances an atomic number greater than or equal to 4. Suitable equipment and techniques are well known to those of skill in the art and are described, for example, in E. P. Bertin, *Principles and Practice of X-ray Spectrometric Analysis*, Chapter 3, Plenum Press, New York (1970)). For example, X-ray fluorescence elemental analysis can be conducted using a portable EDXRF unit like those currently exist for testing of items such as lead in painted surfaces, or sorting of inorganic metal alloys. Specific examples of such units include: XL-300 Series Spectrometer by Niton or Horizon 600 Spectrometer by Oxford Instruments.

X-ray fluorescence is a method of qualitative as well as quantitative analysis for chemical elements based on the measurement of the wavelengths and intensities of the X-ray spectral lines emitted by secondary emission. The primary beam from a high energy source (i.e. X-ray tube) irradiates the material of interest, causing each chemical element present to emit secondary X-ray spectral lines that have wavelengths characteristic to that element (basis of qualitative analysis) and intensities related the concentration of each element present (basis of quantitative analysis). In materials defined as being inorganic or organometallic, XRF is able to detect the presence of inorganic and organometallic materials in the range of micrograms per gram (parts per million) to percent (parts per hundred) of total composition.

Two XRF techniques are commonly employed, wavelength dispersive (WDXRF) and energy dispersive (EDXRF). These techniques are described, for example, in R. Jenkins et al., *Quantitative X-ray Spectrometry*, Chapter 8, Marcel Dekker Inc., New York, (1981)). WDXRF allows for better sensitivity (detection limits) and separation of overlapped X-ray emission peaks, EDXRF allows for faster data collection times.

In these measurement techniques, the swatch is irradiated by a high-energy source, and the emitted X-rays that are characteristic of the elemental species present are indicated by the X-ray detector. This method is suitable for swatches having a wide variety of different types of substrates, without special preparation. The detected atomic species can be within a compound of a nanomorphic indicator material or can be added as a tracer, in the form of a metal, salt, inorganic, or organometallic compound.

Microscopy Techniques

Depending upon the particular procedure, microscopy techniques can improve, supplement, or replace other testing. Microscopy can be used to locate a portion free of bulk particulate contamination. That portion is examined to detect a pre-selected property of the indicator material. The pre-selected property is measured. The measured value is matched to the members of the closed set of reference profiles. Authentication fails if one or more of the following occur: there is no portion free of bulk particulate contamination, the pre-selected property is not detected in the portion free of bulk particulate contamination, and there is no match with one of the members of the set of reference profiles.

Bulk particulate contamination is the presence of particulate in a bulk state in an amount sufficient to prevent measurement of the pre-selected property or to render a measurement of the pre-selected property unreliable within a level of confidence required by the user. In the first case, the pre-selected property is unmeasureable, and authentication is not possible. In the second case, the level of confidence represents a risk that a non-authentic item will be erroneously authenticated. This will vary with the nature of the substrate and the situation.

The examination of the swatch to locate a portion of the identification marking that is free of particulate contamination can be conducted in any manner that is convenient. Optical microscopy is a convenient procedure, since particles in the size range of a nanocrystalline particulate cannot be visualized by optical microscopy. Thus, any particles detected optically are treated as being bulk state material. A limitation here is that the ink formulation must be selected so as avoid aggregation of the nanocrystalline particulate into clumps within the formulation. Selection of appropriate materials can be readily selected in trial by error.

A convenient standard for the absence of bulk particulate contamination as determined by optical microscopy, is no visible particles within a portion of the identification marking to be measured. Visible particles can be present in other portions of the identification marking. Those visible particles might be clumps of nanocrystalline particles, bulk state pigment that is part of the ink formulation or contamination such as dust. It is unnecessary to determine what the visible particles are. The presence or absence of visible particles is not, in and of itself, determinative of authenticity.

In a particular embodiment, microscopic examination of security materials consists of mounting samples on an ordinary microscopic slide and placing under a 100× objective (such as an Olympus MPlan 100×/0.90) of a quality optical microscope (such as an Olympus BX-40). Transparent samples are illuminated in transmission or in reflectance, while opaque samples must be illuminated in reflectance, using an ordinary tungsten-halogen microscope illuminator. Using either the microscope oculars, or viewing on a monitor from an attached video camera, a sample is brought into focus, and the illumination level is adjusted for maximum visualization. The sample image is then inspected for any evidence of discrete particles present in the security material. If none are discernable, the upper particle size limit is determined to be less than 1 micrometer and the security material is considered nanomorphic.

Direct visual examination can also be used in combination with other techniques to locate a portion of the identification marking free of bulk particulate contamination. This step is useful with swatches dirtied by visible particles, which fail authentication unless a clean portion can be found for further examination.

The examination of the swatch to check for bulk particulate contamination may or may not also detect the presence of nanocrystalline particulate in a portion free of bulk particulate contamination. With optical microscopy and other procedures described above, nanocrystalline particulate remains undetected in the selected portion of the marking (a portion that is free of bulk particulate contamination. If the nanocrystalline particulate remains undetected, then a next step is detection of the nanocrystalline particulate. A property of the particulate is measured, at the same time or after the detection step. Detection and measurement can also occur concurrent with the location of the selected portion, as parts of a continuous procedure.

Compressed fluid printing includes the ejection of nanocrystalline particles at high velocities. With a relatively soft substrate, such as paper, this results in embedment of the particles within a substrate rather than placement of the particles on the surface of the substrate and/or within pores of the substrate. In the embed fingerprint, that is, the distribution of the particles within the substrate, particle position is a function of the kinetic energy distribution of the particles during the compressed fluid printing.

An embedment fingerprint of a swatch can be used in a comparison to reference profiles. A limitation here is that while such a profile is consistent with compressed gas printing, such a profile is not conclusive. It is possible that such profiles could be imitated by other techniques, such as use of a non-colloidal ballistic aerosol. U.S. Pat. No. 6,116,718 discloses printing by using non-colloidal ballistic aerosol. The relative difficulty of such techniques is likely to present a sufficient burden to deter use in faked items.

On the other hand, it is very difficult to provide a similar embedment fingerprint by liquid coating processes. Thin coatings can be achieved in one of two ways by liquid coating processes. In a first way, wet laydown is kept low. This leads to thin dry coatings. In a second way, solids in a solution or dispersion are kept very low, so that even a thick wet coating will result in very thin dry coating. This approach tends to result in mottled coatings, having a non-uniform distribution of the particulate in x-y plane. In either case, bands of particles of different sizes segregate along the z-direction of the coating, depending upon how long it takes to dry the coating after application. The viscosity of the coated layer during drying dictates the final location in the z-direction of particles in the coating. Given this, larger particles tend to move to the bottom of the coating, while smaller particles tend to remain on the top. Particles of a given size tend to remain in the same plane in the z-direction, rather than being distributed in all of the planes.

This generally uniform distribution in one or more layers in a liquid coated layer contrasts with the distribution provided by compressed fluid printing and other high energy processes. In the authentication methods using an embedment pattern, a generally uniform distribution of particles in one or more layers is the condition that would indicate a failed authentication.

The property measured (the embedment fingerprinting) can be a combination of the embedment pattern and size of particles in the swatch. This can be used to differentiate compressed fluid printing from high energy printing methods in which solid particulate of non-nanocrystalline size is added to a gas stream.

The embedment pattern can be examined by electron microscopy. In particular embodiments, the swatch is cut into ultrathin cryo dry sections with a Reichert-Jung ULTRACUT E ultramicrotome with a FC4E cryo attachment. Sections are then positioned on a grid. Once sections have been positioned on the grid, the grid is then removed from the grid holder using a forceps while still in the cryo chamber and moved to the section press located in the cryo chamber for pressing of the sections to the grid. The grid is removed from the press using a forceps and placed in a cryo grid holder, which is then transferred to a cryo grid carrier, which is then transferred into a dewar of liquid nitrogen for cryo transfer into a cryo transfer specimen holder, which is used in a cryo transmission electron microscope ("TEM") for imaging. Photomicrographs can then be obtained by TEM using an electron microscope, such as a Philips CM12 operating at 120 kilovolts.

Particular Embodiments

Referring now to FIGS. 11 and 12, a particular embodiment of the method begins with measuring (26) absorption and preparing a spectrum (absorption vs. wavelength) of the absorption of the indicator material in the ultraviolet-visible light band. A luminescence pattern (intensity of emission vs. wavelength) of the swatch is next obtained (28). Excitation is at the absorption maximum indicated by the absorption spectrum earlier prepared. The swatch is examined (30) under an optical microscope to verify that the tested portion of the swatch is free of bulk particulate contamination. The swatch is also examined (32) by X-ray fluorescence for the presence of an organometallic or inorganic tracer. The swatch is also subject to preparation (34) of ultra thin sections by dry cryo-ultramicrotomy and is examined (36) under a transmission electron microscope to verify the particle size.

The order of testing procedures can be varied, except where earlier data is used in a later procedure or practical considerations are presented. When the measured profile is prepared, a comparison is made to each of the members of the set of reference profiles until a match is obtained or the set is exhausted. An indication is then provided to the operator or an automatic procedure is undertaken. Comparisons of the measured profile to the reference profiles can be undertaken while testing proceeds and further testing and repeated comparisons can be eliminated if an early match is obtained.

In other embodiments, the individual testing procedures can be modified as above described. Many of the testing procedures described here have an inherent uncertainty. A high threshold for uncertainty may require that a measured profile match reference profile values for several tests. All of the tests may not need to be performed to determine the authenticity of a sample within a lower level of confidence. For example, a simplified approach is illustrated in FIG. 13. In this case, an allocated reference profile is identified (38) by reading the indicator marking. The luminescence is measured. Excitation is at a pre-selected wavelength or can be stated by the indicator or provided by a look-up table that is accessed using an alphanumeric key provided by the indicator marking. Comparison and indication/automatic function steps are provided as earlier described.

In any case, the testing can either be continued until all tests available have been completed or until the measured profile has sufficient data to produce a match or no-match result with an adequate assurance of a correct determination. An intermediate approach is also practical in that some tests would always be performed and others only as needed. Considerations here can be the ease of automation of the test procedures and the cost and complexity of required equipment. Testing can also be provided in a hierarchy, in which authentication at a first level can be checked and substantiated at one or more higher levels, as needed. Similarly, the authentication system can be operated at different levels of confidence depending upon existing needs, using a constant population of authenticated items.

Apparatus

Figure 14:
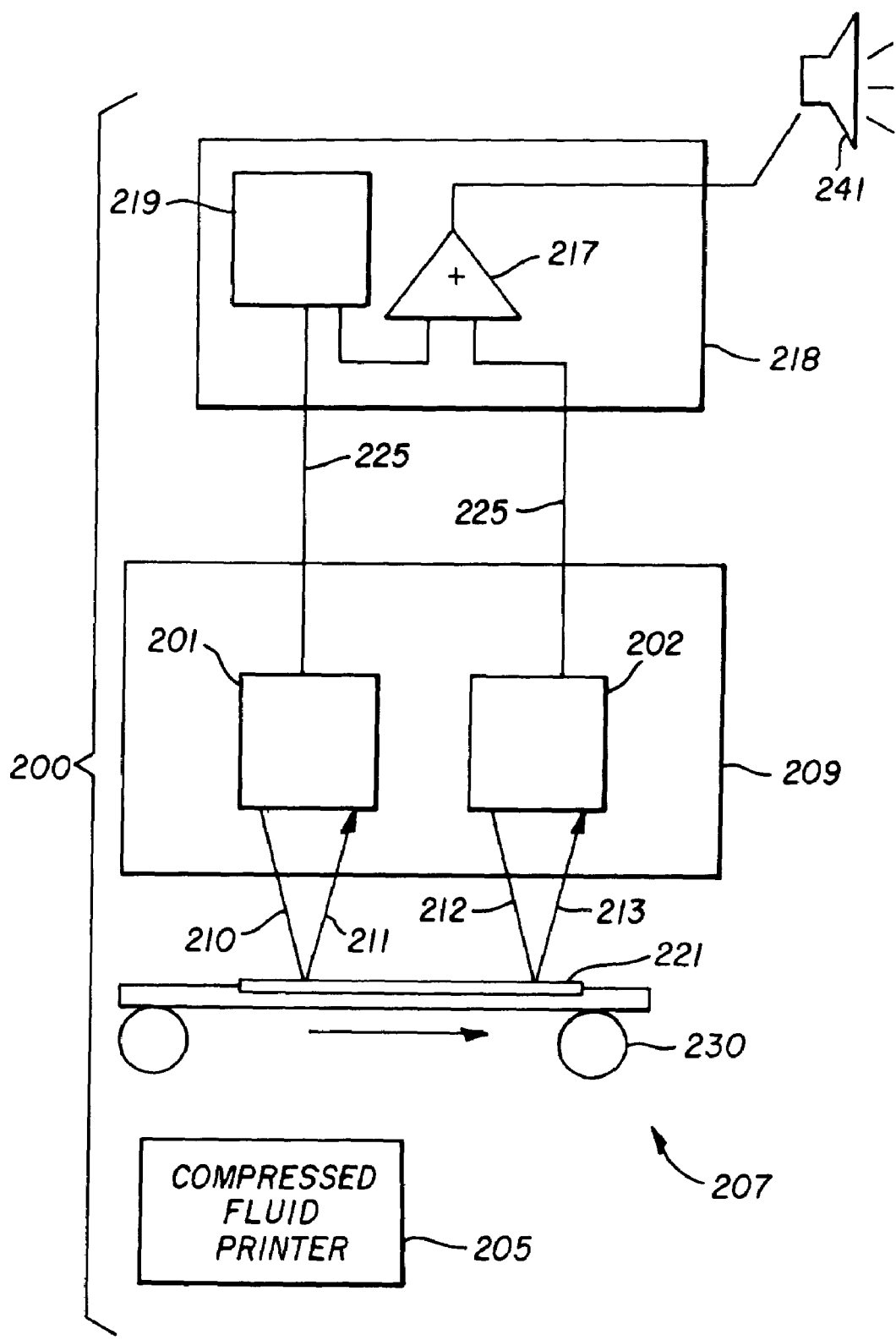
FIG. 14 is a schematic view of an embodiment of the authentication apparatus.

Referring now to FIG. 14, a system 200 includes a compressed fluid printer 205, as earlier described, and an authentication apparatus 207. The apparatus 207 has a testing station 230 that receives a swatch 221. The particular configuration of the testing station 230 is not critical, except as required for a particular purpose. The testing station shown in the figures has a transporter (illustrated as a pair of rollers and a pallet) that also moves the item bearing the swatch. Other fixed or moving testing stations can be provided.

The apparatus 207 has an examination head 209 that is disposed adjoining the testing station 230. They examination head 209 is capable of ascertaining one or more properties of the identification marking to provide a measured profile. The examination head 209 has an identification unit 201 having one or more of the functions earlier discussed in relation to identification and a measurement unit 202 having one or more of the functions earlier discussed in relation to determining the measured profile. Specific examples of identification and measurement units are provided by equipment that provides the earlier discussed functions. For example, an identification unit can include a bar-code reader, an ultraviolet-visible light spectrophotometer, and/or an X-ray fluorescence spectrometer.

In the illustrated embodiment, the identification unit 201 has a bar code reader that provides illumination 210 to the swatch. The reflected light 211 modulated by the bar code is read and a responsive signal is sent by the identification unit along a signal path 225 a control unit 218. The control unit is a microprocessor or programmable computer, or the like. The signal provided by the identification unit is used to access a lookup table 219 having a set of reference profiles. The measurement unit directs an excitation ray 212 at the identification marking. A luminescence emission 213 is returned and analyzed by a spectrometer in the measurement unit 202, resulting in a measured profile that is sent along a signal path to the controller 218. Within the controller, the reference profile provided by the lookup table and the measured profile are compared in a comparison engine 217 that provides a signal to the operator or other responsive action (illustrated as a speaker 241). In FIG. 14, the comparison engine is illustrated as an gate. Alternative comparison engines are well known to those of skill in the art.

The invention has been described in detail with particular reference to certain preferred embodiments thereof, but it will be understood that variations and modifications can be effected within the spirit and scope of the invention.

What is claimed is:

1. A method for authenticating an identification marking, said method comprising the steps of:
ascertaining one or more properties of the marking to provide a measured profile;
comparing said measured profile to at least one member of a closed set of reference profiles, each said reference profile having predetermined values of said one or more properties, each said reference profile being unique within said set, at least one said reference profile being characteristic of an indicator material in a nanocrystalline morphology and non-characteristic of the same indicator material in a bulk morphology.

2. The method of claim 1 wherein another of said reference profiles of said set is characteristic of said indicator material in a bulk morphology and uncharacteristic of said indicator material in a nanocrystalline morphology.

3. The method of claim 1 wherein said indicator material in said nanocrystalline morphology has an absorption peak in the ultraviolet-visible light range and said ascertaining further comprises measuring an absorption spectrum of said marking in the ultraviolet-visible light band.

4. The method of claim 1 wherein said indicator material in said nanocrystalline morphology has an absorption peak in the ultraviolet-visible light range at a wavelength that is shifted relative to a corresponding absorption peak of the same material in a bulk morphology and said ascertaining further comprises measuring absorption of said marking at said wavelength.

5. The method of claim 4 wherein said indicator material in said nanocrystalline morphology has a luminescence emission peak that is shifted relative to a corresponding emission peak of the same material in a bulk morphology and said ascertaining further comprises measuring emission of said marking at said wavelength during excitation at said wavelength of said absorption peak.

6. The method of claim 5 wherein said ascertaining further comprises determining that said measuring is of a region of said marking substantially free of non-nanocrystalline particles.

7. The method of claim 6 wherein said determining further comprises examining said region by light microscopy.

8. The method of claim 7 wherein said marking includes an inorganic, organic-inorganic, or organo-metallic compound that has at least one atomic species having an atomic number equal to or greater than 11, and said measuring further comprises preparing an X-ray fluorescence spectra of said marking.

9. The method of claim 8 wherein said determining is by one of wavelength dispersive X-ray fluorescence analysis and energy dispersive X-ray fluorescence analysis.

10. The method of claim 8 wherein said inorganic, organic-inorganic, or organo-metallic compound is different than said indicator material.

11. The method of claim 8 wherein said measuring further comprises the steps of:
preparing sections of said marking by dry cryo-ultramicrotomy; and
examining said sections by transmission electron microscopy.

12. The method of claim 11 wherein said examining includes locating a nanocrystalline particulate.

13. The method of claim 12 wherein said examining includes determining an embedment depth of said particulate.

14. The method of claim 1 wherein said indicator material in said nanocrystalline morphology has a luminescence emission peak that is shifted relative to a corresponding emission peak of the same material in a bulk morphology and said measuring further comprises measuring emission of said marking at said wavelength.

15. The method of claim 14 wherein said ascertaining further comprises determining that said measuring is of a region of said marking substantially free of non-nanocrystalline particles.

16. The method of claim 14 wherein said determining further comprises examining said region by light microscopy.

17. The method of claim 16 wherein said marking includes an inorganic, organic-inorganic, or organo-metallic compound that has at least one atomic species having an atomic number equal to or greater than 11, and said measuring further comprises preparing an X-ray fluorescence spectra of said marking.

18. The method of claim 17 wherein said determining is a wavelength dispersive X-ray fluorescence analysis.

19. The method of claim 17 wherein said determining is an energy dispersive X-ray fluorescence analysis.

20. The method of claim 17 wherein said inorganic, organic-inorganic, or organo-metallic compound is different than said indicator material.

21. The method of claim 1 wherein said marking includes an inorganic, organic-inorganic, or organo-metallic compound that has at least one atomic species having an atomic number equal to or greater than 11, and said measuring further comprises determining the X-ray fluorescence spectra of said marking.

22. The method of claim 21 wherein said inorganic, organic-inorganic, or organo-metallic compound is different than said indicator material.

23. The method of claim 22 wherein said determining further comprises examining said region by light microscopy.

24. The method of claim 1 further comprising, prior to said comparing, identifying one member of said closed set of reference profiles that is allocated to said identification marking.

25. The method of claim 24 wherein said identifying further comprises reading an identifier.

26. The method of claim 25 wherein said identifier is encoded and said identifying further comprises decoding said identifier following said reading.

27. The method of claim 24 wherein said identifying further comprises chemically characterizing said compound.

28. The method of claim 27 wherein said characterizing includes analyzing said compound by mass spectroscopy.

29. The method of claim 28 wherein said characterizing includes determining the molecular weight of said compound.

30. The method of claim 27 wherein said characterizing includes conducting secondary ion mass spectrometry of said marking.

31. The method of claim 1 wherein said marking has a modulation of said one or more properties extending along one or more dimensions of said marking and said identifying further comprises reading said modulation.

32. The method of claim 31 wherein said modulation is machine-readable.

33. The method of claim 1 wherein said indicator material is a compound having a molecular weight in the range of 10 to 100,000 Daltons.

34. The method of claim 1 wherein said indicator material is a compound having a molecular weight in the range of 10 to 20,000 Daltons.

35. The method of claim 1 wherein said indicator material is a compound having a molecular weight in the range of 10 to 10,000 Daltons.

36. The method of claim 1 wherein said indicator material is a particulate having particles with diameters of less than 50 nanometers.

37. The method of claim 36 wherein said diameters are less than 30 nanometers.

38. The method of claim 36 wherein said diameters are less than 20 nanometers.

39. The method of claim 1 wherein each said reference profile is characteristic of a mixture of a plurality of indicator materials, each said indicator material being in a nanocrystalline morphology, and each said reference profile is non-characteristic of a corresponding mixture of the same indicator materials, each being in a bulk morphology.

40. The method of claim 1 further comprising, prior to said ascertaining, printing a swatch having said identification marking.

41. The method of claim 1 further comprising, prior to said ascertaining, printing a swatch having said identification marking on an adhesive label.

42. An authentication apparatus for use with authentication swatches having identification markings, said apparatus comprising:
   a testing station receiving said swatches;
   an examination head disposed adjoining said station, said examination head being capable of ascertaining one or more properties of the marking to provide a measured profile;
   a look-up table having a closed set of reference profiles, each said reference profile having predetermined values of said one or more properties, each said reference profile being unique within said set, at least one said reference profile being characteristic of an indicator material in a nanocrystalline morphology and non-characteristic of the same indicator material in a bulk morphology;
   a comparison engine operatively connected to said examination head and said look-up table, said comparison engine being capable of comparing said measured profile with each of said reference profiles.

43. The apparatus of claim 42 wherein said examination head includes an ultraviolet-visible light spectrophotometer.

44. The apparatus of claim 42 wherein said examination head includes a spectroscopy system for micro-luminescence and micro-RAMAN spectroscopy.

45. The apparatus of claim 44 wherein said examination head includes an X-ray fluorescence spectrometer.

46. The apparatus of claim 45 wherein said examination head includes an optical microscope.

47. An authentication system comprising:
   a plurality of swatches, each said swatch having an identification marking, said marking including an indicator material in a nanocrystalline morphology; and
   an authentication apparatus including:
      a testing station configured to receive said swatches;
      an examination head disposed adjoining said station, said examination head being capable of ascertaining one or more properties of said identification markings to provide a measured profile;
      a look-up table having a closed set of reference profiles, each said reference profile having predetermined values of said one or more properties, each said reference profile being unique within said set, each said reference profile being characteristic of a respective said indicator material in a nanocrystalline morphology and non-characteristic of the same indicator material in a bulk morphology;
      a comparison engine operatively connected to said examination head and said look-up table, said comparison engine being capable of comparing said measured profile with each of said reference profiles.

48. The system of claim 47 further comprising a compressed fluid printer capable of generating said indicator material and printing said swatches.

49. The system of claim 47 further comprising a compressed fluid deposition device capable of generating said indicator material and a printer capable of printing said swatches.

* * * * *